US010833899B2

(12) United States Patent
Chou et al.

(10) Patent No.: US 10,833,899 B2
(45) Date of Patent: Nov. 10, 2020

(54) LOW POWER PHYSICAL LAYER DRIVER TOPOLOGIES

(71) Applicant: QUALCOMM Incorporated, San Diego, CA (US)

(72) Inventors: Shih-Wei Chou, San Diego, CA (US); Chulkyu Lee, San Diego, CA (US); Dhaval Sejpal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/526,332

(22) Filed: Jul. 30, 2019

(65) Prior Publication Data

US 2019/0356519 A1 Nov. 21, 2019

Related U.S. Application Data

(60) Division of application No. 16/050,603, filed on Jul. 31, 2018, now Pat. No. 10,419,252, which is a
(Continued)

(51) Int. Cl.
*H04L 25/02* (2006.01)
*H04L 25/493* (2006.01)
(Continued)

(52) U.S. Cl.
CPC ........ *H04L 25/493* (2013.01); *G06F 13/4072* (2013.01); *H04B 1/04* (2013.01);
(Continued)

(58) Field of Classification Search
CPC ............. G06F 13/4072; H04L 25/0272; H04L 25/493; H04L 25/4917; H04L 25/02;
(Continued)

(56) References Cited

U.S. PATENT DOCUMENTS 6,208,168 B1 * 3/2001 Rhee ................... G11C 7/1051
326/83
8,064,535 B2 11/2011 Wiley et al.
(Continued)

FOREIGN PATENT DOCUMENTS

CN 101527781 A 9/2009
JP H04230147 A 8/1992
(Continued)

OTHER PUBLICATIONS

International Search Report and Written Opinion—PCT/US2016/036073—ISA/EPO—dated Aug. 29, 2016.
(Continued)

*Primary Examiner* — Sophia Vlahos
(74) *Attorney, Agent, or Firm* — Loza & Loza LLP

(57) ABSTRACT

System, methods and apparatus are described that facilitate transmission of data, particularly between two devices within electronic equipment. Transmission lines are selectively terminated in an N-phase polarity encoded transmitter when the transmission lines would otherwise be undriven. Data is mapped to a sequence of symbols to be transmitted on a plurality of wires. The sequence of symbols is encoded in three signals. A first terminal of a plurality of terminals may be driven such that transistors are activated to couple the first terminal to first and second voltage levels. The first terminal may further be driven such that a dedicated transistor is activated to couple the first terminal to an intermediate voltage level.

8 Claims, 25 Drawing Sheets

Related U.S. Application Data continuation-in-part of application No. 15/950,779, filed on Apr. 11, 2018, now abandoned, which is a division of application No. 15/172,913, filed on Jun. 3, 2016, now Pat. No. 9,998,154.

(60) Provisional application No. 62/183,050, filed on Jun. 22, 2015.

(51) Int. Cl.
*G06F 13/40* (2006.01)
*H04B 1/04* (2006.01)
*H04B 3/52* (2006.01)

(52) U.S. Cl.
CPC ............... *H04B 3/52* (2013.01); *H04L 25/02* (2013.01); *H04L 25/028* (2013.01); *H04L 25/0272* (2013.01); *H04L 25/0276* (2013.01)

(58) Field of Classification Search
CPC ............... H04L 25/0276; H04L 25/028; H04L 25/03343; H03M 5/16; H03M 5/20; H04B 1/04; H04B 3/52; H03K 19/018521; H03K 19/0002
See application file for complete search history.

(56) References Cited

U.S. PATENT DOCUMENTS

| | | |
|---|---|---|
| 8,996,740 B2 | 3/2015 | Wiley et al. |
| 9,148,198 B1 | 9/2015 | Zhang et al. |
| 9,998,154 B2 | 6/2018 | Chou et al. |
| 2009/0045844 A1 | 2/2009 | Noh et al. |
| 2009/0225206 A1 | 9/2009 | Oike et al. |
| 2010/0027706 A1 | 2/2010 | Tanimoto et al. |
| 2010/0237904 A1* | 9/2010 | Shau ............... H03K 19/018585 326/30 |
| 2012/0155565 A1 | 6/2012 | Wiley et al. |
| 2013/0099823 A1* | 4/2013 | Moon ............ H03K 19/018521 326/87 |
| 2013/0241759 A1 | 9/2013 | Wiley et al. |
| 2014/0112401 A1 | 4/2014 | Wiley et al. |
| 2014/0226734 A1 | 8/2014 | Fox et al. |
| 2014/0254712 A1 | 9/2014 | Lee et al. |
| 2014/0348214 A1 | 11/2014 | Sengoku et al. |
| 2016/0365851 A1* | 12/2016 | Lee .................... H03K 19/0185 |
| 2016/0373141 A1 | 12/2016 | Chou et al. |
| 2017/0187413 A1* | 6/2017 | Saeki ....................... H04B 1/40 |
| 2018/0234122 A1 | 8/2018 | Chou et al. |
| 2018/0304829 A1* | 10/2018 | Yanagawa ............... H01L 29/00 |
| 2018/0337698 A1 | 11/2018 | Chou et al. |

FOREIGN PATENT DOCUMENTS

| | | |
|---|---|---|
| JP | H06261092 A | 9/1994 |
| WO | 2007125963 A1 | 11/2007 |
| WO | 08109478 A2 | 9/2008 |
| WO | 2014005117 A1 | 1/2014 |
| WO | 2016209601 A1 | 12/2016 |

OTHER PUBLICATIONS

Duan C., et al., "Energy Efficient and High Speed On-Chip Ternary Bus", 2008 Design, Automation and Test in Europe, Munich, Germany, Mar. 10-14, 2008, Piscataway, NJ, IEEE Service Center, US, Oct. 3, 2008, pp. 515-518, XP058288721, DOI:10.1145/1403375.1403499, ISBN: 978-3-9810801-3-1, p. 517, Left-Hand column—p. 518, Left-Hand column.

International Search Report and Written Opinion—PCT/US2019/042463—ISA/EPO—dated Oct. 22, 2019.

* cited by examiner

LOW POWER PHYSICAL LAYER DRIVER TOPOLOGIES

CROSS-REFERENCE TO RELATED APPLICATIONS

This application is a divisional application of U.S. Non-Provisional application Ser. No. 16/050,603, entitled "LOW POWER PHYSICAL LAYER DRIVER TOPOLOGIES" filed on Jul. 31, 2018, which is a continuation-in-part application of U.S. Non-Provisional application Ser. No. 15/950,779, entitled "LOW POWER PHYSICAL LAYER DRIVER TOPOLOGIES" filed on Apr. 11, 2018, which is a divisional application of U.S. Non-Provisional application Ser. No. 15/172,913, entitled "LOW POWER PHYSICAL LAYER DRIVER TOPOLOGIES" filed on Jun. 3, 2016, now U.S. Pat. No. 9,998,154, issued on Jun. 12, 2018, which claims priority to and the benefit of U.S. Provisional Application Ser. No. 62/183,050, entitled "LOW POWER PHYSICAL LAYER DRIVER TOPOLOGIES" filed on Jun. 22, 2015, the entire contents of which are incorporated herein by reference.

BACKGROUND

Field

The present disclosure relates generally to high-speed data communications, and more particularly, to line interfaces for driving signal wires in a multi-phase system.

Background

High-speed interfaces are frequently used between circuits and components of mobile devices and other complex apparatus. For example, certain devices may include processing, communications, storage and/or display devices that interact with one another through communications links. Some of these devices, including synchronous dynamic random access memory (SDRAM), may be capable of providing or consuming data and control information at processor clock rates. Other devices, such as display controllers, may require variable amounts of data at relatively low video refresh rates.

High-speed interfaces are often limited by clock skew and are subject to interference. High frequency signals are often transmitted using differential interfaces to provide common-mode rejection for critical signals. In devices such as memory devices, which transmit and receive large amounts of data over wide data and control buses, interfaces may be expensive and may consume significant power and real-estate on a circuit board.

SUMMARY

Embodiments disclosed herein provide systems, methods and apparatus for communicating between two devices that may be collocated in an electronic apparatus and communicatively coupled through one or more data links.

In an aspect of the disclosure, a method for data transfer includes mapping data to a sequence of symbols to be transmitted on a plurality of wires via a plurality of terminals, encoding the sequence of symbols in three signals, wherein each of the three signals is in one of three phases for each symbol to be transmitted, and wherein the three signals are in different phases from one another during transmission of each symbol, obtaining a signal to be transmitted via a terminal of the plurality of terminals, wherein the signal is one of the three signals, driving the terminal towards a first voltage level by turning on a first transistor when the signal is in a first phase, driving the terminal towards a second voltage level by turning on a second transistor when the signal is in a second phase, and driving the terminal towards a third voltage level by turning on a third transistor when the signal is in a third phase, wherein a source of the first transistor and a source of the third transistor are coupled to a first end of a first resistor, and a second end of the first resistor is coupled to the terminal and a first end of a second resistor. The first end of the second resistor is coupled to the terminal and the second end of the first resistor, and a second end of the second resistor is coupled to a drain of the second transistor.

In another aspect of the disclosure, a transmitter for data transfer includes a plurality of terminals and a line driver configured to transmit a signal via a terminal of the plurality of terminals, the signal being in one of three phases. The line driver includes a first transistor, a second transistor, and a third transistor, wherein a source of the first transistor and a source of the third transistor are coupled to a first end of a first resistor, and a second end of the first resistor is coupled to the terminal and a first end of a second resistor. The line driver is configured to drive the terminal towards a first voltage level by turning on the first transistor when the signal is in a first phase, drive the terminal towards a second voltage level by turning on the second transistor when the signal is in a second phase, and drive the terminal towards a third voltage level by turning on the third transistor when the signal is in a third phase. The first end of the second resistor is coupled to the terminal and the second end of the first resistor, and a second end of the second resistor is coupled to a drain of the second transistor.

The transmitter further includes a processing circuit coupled to the line driver. The processing circuit is configured to map data to a sequence of symbols to be transmitted on a plurality of wires via the plurality of terminals, encode the sequence of symbols in three signals, wherein each of the three signals is in one of three phases for each symbol to be transmitted, and wherein the three signals are in different phases from one another during transmission of each symbol, and obtain the signal to be transmitted via the terminal of the plurality of terminals, wherein the signal is one of the three signals.

In a further aspect of the disclosure, an apparatus for data transfer includes means for mapping data to a sequence of symbols to be transmitted on a plurality of wires via the plurality of terminals, means for encoding the sequence of symbols in three signals, wherein each of the three signals is in one of three phases for each symbol to be transmitted, and wherein the three signals are in different phases from one another during transmission of each symbol, means for obtaining a signal to be transmitted via a terminal of a plurality of terminals, wherein the signal is one of the three signals, means for driving the terminal towards a first voltage level by turning on a first transistor when the signal is in a first phase, means for driving the terminal towards a second voltage level by turning on a second transistor when the signal is in a second phase, and means for driving the terminal towards a third voltage level by turning on a third transistor when the signal is in a third phase, wherein a source of the first transistor and a source of the third transistor are coupled to a first end of a first resistor, and a second end of the first resistor is coupled to the terminal and a first end of a second resistor. The first end of the second resistor is coupled to the terminal and the second end of the first resistor, and a second end of the second resistor is coupled to a drain of the second transistor.

In an aspect of the disclosure, a method of data transfer includes mapping data to a sequence of symbols to be transmitted on a plurality of wires via a plurality of terminals, encoding the sequence of symbols in three signals, wherein each of the three signals is in one of three phases for each symbol to be transmitted, and wherein the three signals are in different phases from one another during transmission of each symbol, obtaining a signal to be transmitted via a terminal of the plurality of terminals, wherein the signal is one of the three signals, driving the terminal towards a first voltage level by turning on a first transistor when the signal is in a first phase, driving the terminal towards a second voltage level by turning on a second transistor when the signal is in a second phase, and driving the terminal towards a third voltage level by turning on a third transistor when the signal is in a third phase, wherein a source of the first transistor, a source of the third transistor, a first end of a resistor, and a drain of the second transistor are coupled to each other, and wherein a second end of the resistor is coupled to the terminal.

In another aspect of the disclosure, a transmitter for data transfer includes a plurality of terminals and a line driver configured to transmit a signal via a terminal of the plurality of terminals, the signal being in one of three phases. The line driver includes a first transistor, a second transistor, and a third transistor, wherein a source of the first transistor, a source of the third transistor, a first end of a resistor, and a drain of the second transistor are coupled to each other, and wherein a second end of the resistor is coupled to the terminal. The line driver is configured to drive the terminal towards a first voltage level by turning on the first transistor when the signal is in a first phase, drive the terminal towards a second voltage level by turning on the second transistor when the signal is in a second phase, and drive the terminal towards a third voltage level by turning on the third transistor when the signal is in a third phase.

The transmitter further includes a processing circuit coupled to the line driver. The processing circuit is configured to map data to a sequence of symbols to be transmitted on a plurality of wires via the plurality of terminals, encode the sequence of symbols in three signals, wherein each of the three signals is in one of three phases for each symbol to be transmitted, and wherein the three signals are in different phases from one another during transmission of each symbol, obtain the signal to be transmitted via the terminal of the plurality of terminals, wherein the signal is one of the three signals.

In a further aspect of the disclosure, an apparatus for data transfer includes means for mapping data to a sequence of symbols to be transmitted on a plurality of wires via a plurality of terminals, means for encoding the sequence of symbols in three signals, wherein each of the three signals is in one of three phases for each symbol to be transmitted, and wherein the three signals are in different phases from one another during transmission of each symbol, means for obtaining a signal to be transmitted via a terminal of the plurality of terminals, wherein the signal is one of the three signals, means for driving the terminal towards a first voltage level by turning on a first transistor when the signal is in a first phase, means for driving the terminal towards a second voltage level by turning on a second transistor when the signal is in a second phase, and means for driving the terminal towards a third voltage level by turning on a third transistor when the signal is in a third phase, wherein a source of the first transistor, a source of the third transistor, a first end of a resistor, and a drain of the second transistor are coupled to each other, and wherein a second end of the resistor is coupled to the terminal.

DETAILED DESCRIPTION

Figure 1:
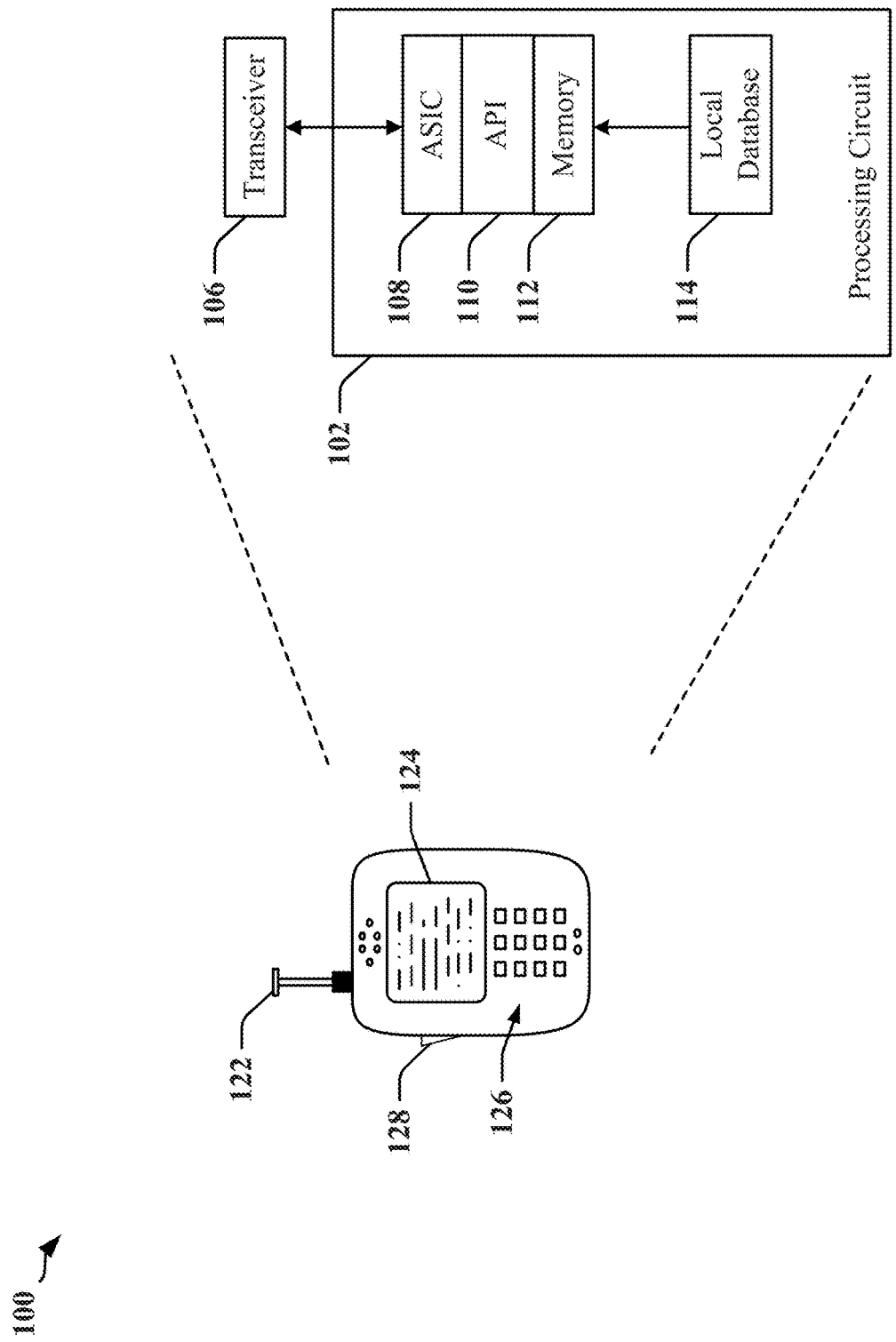
FIG. 1 depicts an apparatus that employs an N-phase polarity encoded data link between devices within the apparatus.

Various aspects are now described with reference to the drawings. In the following description, for purposes of explanation, numerous specific details are set forth in order to provide a thorough understanding of one or more aspects.

It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Exemplary Description of Multi-Phase Encoding and Decoding

Certain disclosed examples relate to systems and apparatus that employ multi-phase data encoding and decoding methods involving a plurality of conductors (i.e., M conductors or wires). The M conductors typically include three or more conductors, and each conductor may be referred to as a wire, although the M conductors may include conductive traces on a circuit board or within a conductive layer of a semiconductor integrated circuit (IC) device. The M conductors may be divided into a plurality of transmission groups, each group encoding a portion of a block of data to be transmitted. An N-phase encoding scheme is defined in which bits of data are encoded in phase transitions and polarity changes on the M conductors. In one example, an N-phase encoding scheme for a 3-wire system may include three phase states and two polarities, providing 6 states and 5 possible transitions from each state. Deterministic voltage and/or current changes may be detected and decoded to extract data from the M conductors. Decoding does not rely on independent conductors, or pairs of conductors and timing information can be derived directly from phase and/or polarity transitions in the M conductors. N-Phase polarity data transfer can be applied to any signaling interface, such as electrical, optical and radio frequency (RF) interfaces, for example.

Certain aspects of the invention may be applicable to communications links deployed between electronic components, which may include subcomponents of devices such as telephones, mobile computing devices, appliances, automobile electronics, avionics systems, etc. Referring to FIG. 1, for example, an apparatus 100 employing M-wire, N-phase encoding may include a processing circuit 102 that is configured to control operation of the apparatus 100. The processing circuit 102 may access and execute software applications and control logic circuits and other devices within the apparatus 100. In one example, the apparatus 100 may include a communication device that communicates through an RF communications transceiver 106 with a radio access network (RAN), a core access network, the Internet and/or another network. The communications transceiver 106 may be operably coupled to a processing circuit 102. The processing circuit 102 may include one or more IC devices, such as an application specific IC (ASIC) 108. The ASIC 108 may include one or more processing devices, logic circuits, and so on. The processing circuit 102 may include and/or be coupled to processor readable storage 112 that may maintain instructions and data that may be executed by the processing circuit 102. The processing circuit 102 may be controlled by one or more of an operating system and an application programming interface (API) 110 layer that supports and enables execution of software modules residing in the storage 112 of the device. The storage 112 may include read-only memory (ROM) or random-access memory (RAM), electrically erasable programmable read-only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
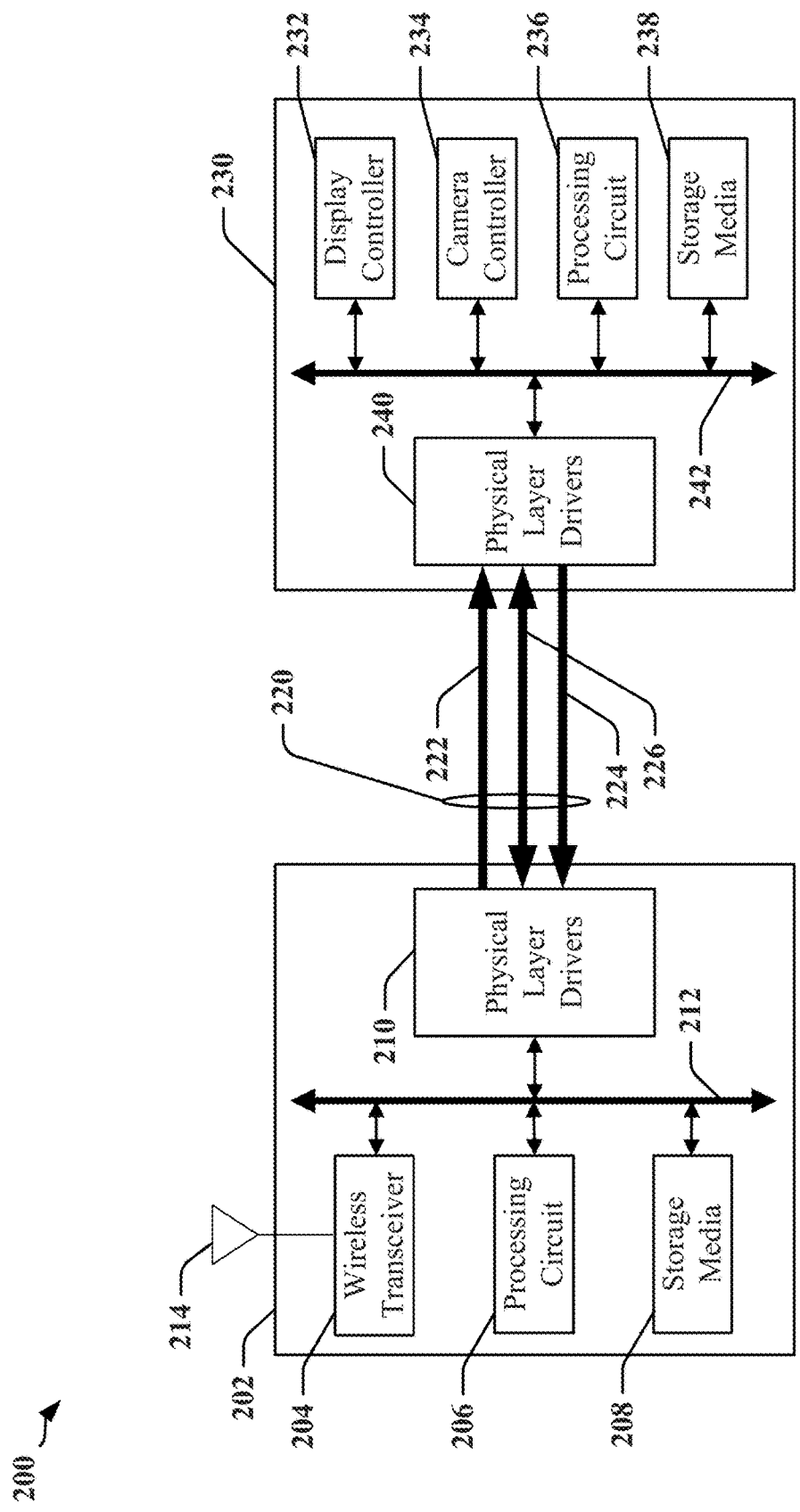
FIG. 2 illustrates a system architecture for an apparatus employing an N-phase polarity encoded data link.

FIG. 2 is a block schematic illustrating certain aspects of an apparatus 200 such as a mobile device, a mobile telephone, a mobile computing system, a notebook computer, a tablet computing device, a media player, a gaming device, or the like. The apparatus 200 may include a plurality of IC devices 202 and 230 that exchange data and control information through a communications link 220. The communications link 220 may be used to connect the IC devices 202 and 230, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. A portion of the communications link 220 may include a cable or an optical connection.

The communications link 220 may include multiple channels 222, 224 and 226. One or more channels 226 may be bidirectional, and may operate in half-duplex mode and/or full-duplex mode. One or more channels 222, 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host, master and/or transmitter, while the second IC device 230 may be designated as a client, slave and/or receiver, even if both IC devices 202 and 230 are configured to transmit and receive on the communications link 220. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining communications through a transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support a display such as a liquid crystal display (LCD) panel, a touch-screen display, an indicator, and so on. The storage media 208 and 238 may include transitory and/or non-transitory storage devices adapted to maintain instructions and data used by the respective processing circuits 206 and 236, and/or other components of the IC devices 202 and 230. Communication between each processing circuit 206, 236 and its corresponding storage media 208 and 238 and other modules and circuits may be facilitated by one or more buses 212 and 242, respectively.

The reverse link 224 may be operated in the same manner as the forward link 222. The forward link 222 and the reverse link 224 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a single bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In certain examples, the reverse link 224 derives a clocking signal from the forward link 222 for synchronization purposes, for control purposes, to facilitate power management and/or for simplicity of design. The clocking signal may have a frequency that is obtained by dividing the frequency of a symbol clock used to transmit signals on the forward link 222. The symbol clock may be superimposed or otherwise encoded in symbols transmitted on the forward link 222. The use of a clocking signal that is a derivative of the symbol clock allows fast synchronization of transmitters and receivers (transceivers 210, 240) and enables fast start and stop of data signals without the need for framing to enable training and synchronization.

In certain examples, a single bidirectional link 226 may support communications between the first processing device 202 and the second processing device 230. In some instances, the first processing device 202 and the second processing device 230 provide encoding and decoding of data, address and control signals transmitted between a processing device and memory devices such as dynamic random access memory (DRAM).

In one example, one or more of buses 212 and/or 242 may provide access to double data rate (DDR) SDRAM using an M-wire, N-phase encoding technique. N-phase polarity encoding devices 210 and/or 240 can encode multiple bits per transition, and multiple sets of wires can be used to transmit and receive data from the SDRAM, control signals, address signals, and so on.

In another example, the communications link 220 includes a high-speed digital interface, such as a mobile display digital interface (MDDI), and one or more data links 222, 224 and 226 may use N-phase polarity encoding. Transceivers 210 and 240 may encode and decode data transmitted on the communications link 220. The use of N-phase polarity encoding provides for high speed data transfer and may consume half or less of the power of other interfaces because fewer drivers are active in N-phase polarity encoded data links 220. N-phase polarity encoding devices 210 and/or 240 can encode multiple bits per transition on the interface, which may include a bus. In one example, a combination of 3-phase and polarity encoding may be used to support a wide video graphics array (WVGA) 80 frames per second LCD driver IC without a frame buffer, delivering pixel data at 810 Mbps for display refresh.

According to certain aspects disclosed herein, characteristics of an M-wire, N-phase polarity communications link may be dynamically modified to accommodate changing operational requirements and circumstances. For example, the number of wires used to transmit an N-phase signal may be increased to obtain a higher available bandwidth and/or the number of wires used to transmit an N-phase signal may be decreased to reduce power consumption by the IC devices 202 and 230. The number of wires used to transmit an N-phase signal in one direction may be adapted independently of the number of wires used to transmit an N-phase signal in the other direction. Receiving circuits and transmitting circuits in the physical layer drivers 210 and 240 may be configured using control information transmitted when the communications link 220 is activated after hibernation or power-on. The control information may be transmitted according to a predefined protocol, whereby a minimum number of wires are activated to carry a control message specifying the configuration of the communications link 220, for example. The control message may alternatively or additionally be transmitted with a shutdown command, a wakeup command, and/or in a preamble preceding each transmission. In some examples, the configuration of the communications link 220 may be determined during a training and/or synchronization sequence, whereby the receiving physical layer drivers 210 or 240 monitors the available wires or other conductors for transitions corresponding to an N-phase signal, in order to determine which wires/conductors are active.

Figure 3:
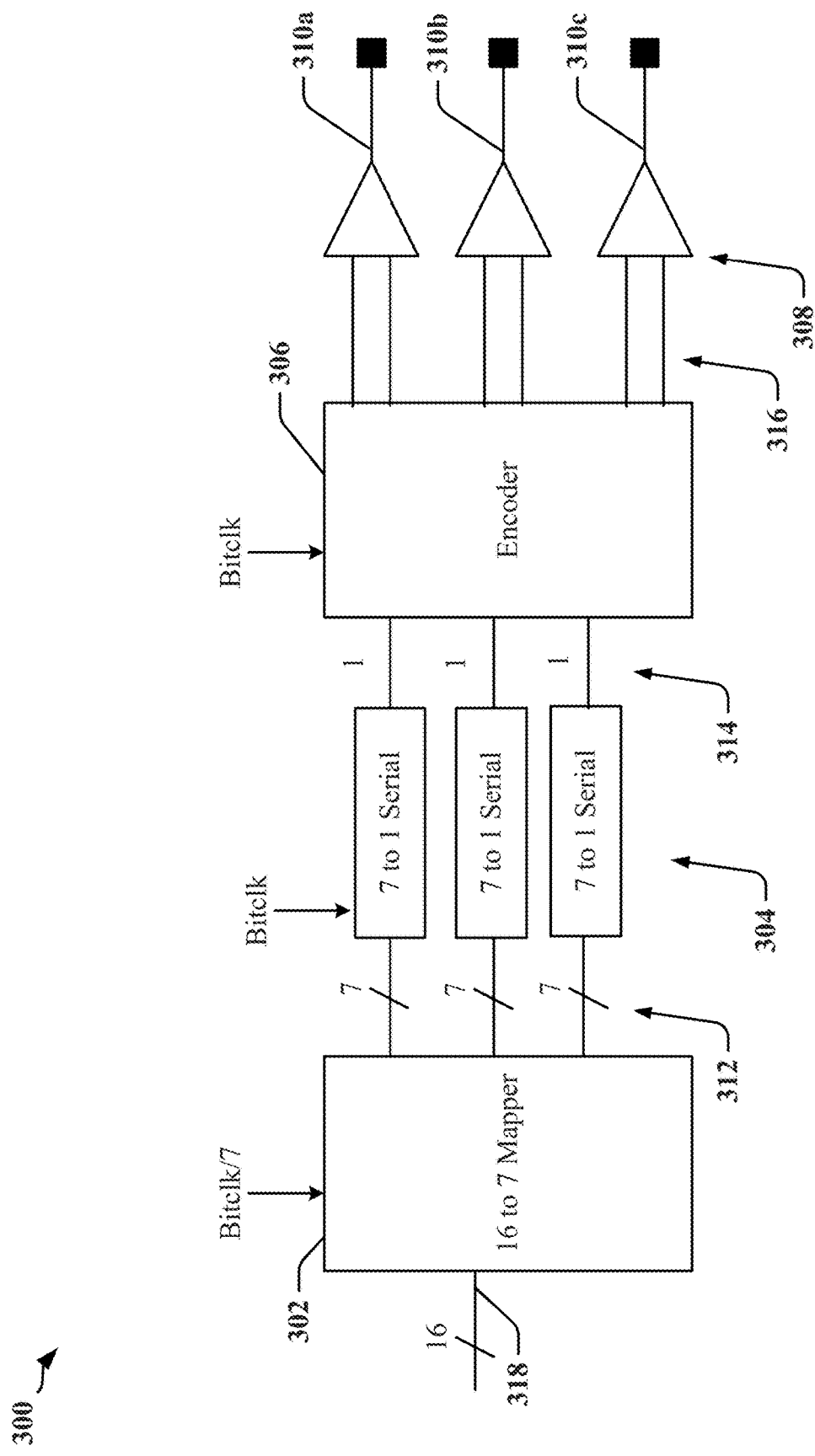
FIG. 3 illustrates an example of an N-phase polarity data encoder.

FIG. 3 is a diagram 300 illustrating an example of an M-wire, N-phase polarity encoding transmitter configured for M=3 and N=3. The example of 3-wire, 3-phase encoding is selected solely for the purpose of simplifying descriptions of certain aspects of this disclosure. The principles and techniques disclosed for 3-wire, 3-phase encoders can be applied in other configurations of M-wire, N-phase polarity encoders.

When N-phase polarity encoding is used, conductors such as signal wires 310a, 310b and 310c on an M-wire bus may be undriven, driven positive, or driven negative. An undriven signal wire 310a, 310b or 310c may be in a high-impedance state. An undriven signal wire 310a, 310b or 310c may be driven to a voltage level that lies substantially halfway between the positive and negative voltage levels provided on driven signal wires. An undriven signal wire 310a, 310b or 310c may have no current flowing through it. In the example illustrated in FIG. 3, each signal wire 310a, 310b and 310c may be in one of three states (denoted as +1, −1, and 0) using drivers 308. In one example, drivers 308 may include unit-level current-mode drivers. In another example, drivers 308 may drive opposite polarity voltages on two signals 310a and 310b while the third signal 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each pair of consecutive symbol transmission intervals, at least one signal wire 310a, 310b or 310c has a different state in the two symbol transmission intervals.

In the example depicted in FIG. 3, 16-bit data 318 is input to a mapper 302, which maps the input data 318 to 7 symbols 312 for transmitting sequentially over the signal wires 310a, 310b and 310c. The 7 symbols 312 may be serialized, using parallel-to-serial converters 304 for example. An M-wire, N-phase encoder 306 receives 7 symbols 312 produced by the mapper one symbol at a time and computes the state of each signal wire 310a, 310b and 310c for each symbol interval. The encoder 306 selects the states of the signal wires 310a, 310b and 310c based on the input symbol and the previous states of signal wires 310a, 310b and 310c.

The use of M-wire, N-phase encoding permits a number of bits to be encoded in a plurality of symbols where the bits per symbol is not an integer. In the simple example of a 3-wire system, there are 3 available combinations of 2 wires that may be driven simultaneously, and 2 possible combinations of polarity on the pair of simultaneously driven wires, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 4:
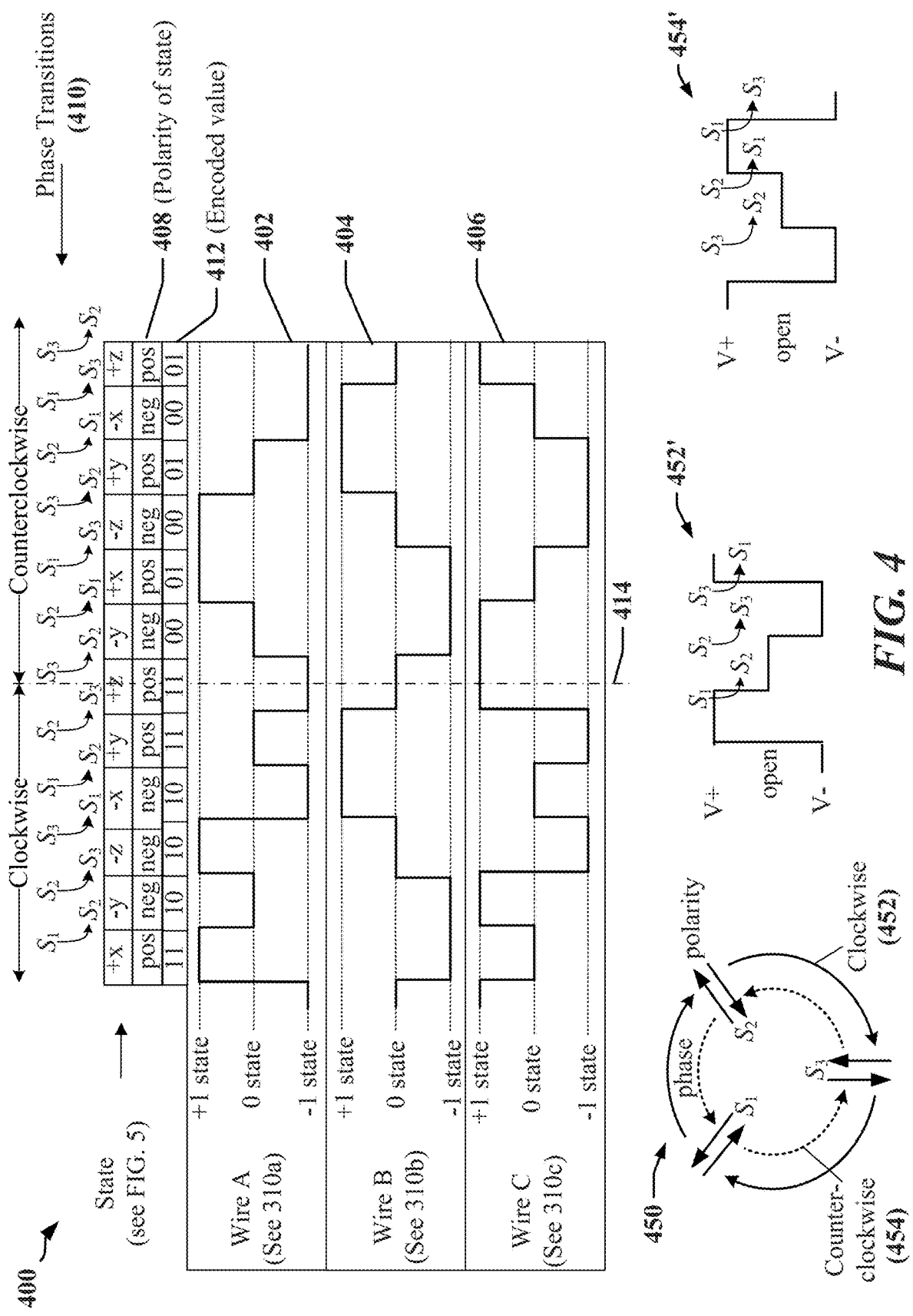
FIG. 4 illustrates signaling in an N-phase polarity encoded interface.

FIG. 4 illustrates an example of signaling 400 employing a three-phase modulation data-encoding scheme based on the circular state transition diagram 450. According to the data-encoding scheme, a three-phase signal may rotate in two directions and may be transmitted on three conductors 310a, 310b, and 310c. Each of the three signals is independently driven on the conductors 310a, 310b, and 310c. Each of the three signals includes the three-phase signal, with each signal on each conductor 310a, 310b, and 310c being 120 degrees out of phase relative to the signals on the other two conductors 310a, 310b, and 310c. At any point in time, each of the three conductors 310a, 310b, 310c is in a different one of the states {+1, 0, −1}. At any point in time, each of the three conductors 310a, 310b, 310c in a 3-wire system is in a different state than the other two wires. When more than three conductors or wires are used, two or more pairs of wires may be in the same state. The illustrated encoding scheme also encodes information in the polarity of the two conductors 310a, 310b, and/or 310c that are actively driven to the +1 and −1 states. Polarity is indicated at 408 for the sequence of states depicted.

At any phase state in the illustrated three-wire example, exactly two of the conductors 310a, 310b, 310c carry a signal which is effectively a differential signal for that phase state, while the third conductor 310a, 310b or 310c is undriven. The phase state for each conductor 310a, 310b, 310c may be determined by voltage difference between the conductor 310a, 310b or 310c and at least one other conductor 310a, 310b and/or 310c, or by the direction of current flow, or lack of current flow, in the conductor 310a, 310b or 310c. As shown in the state transition diagram 450, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a three-wire, three-phase communications link, clockwise rotations ($S_1$ to $S_2$), ($S_2$ to $S_3$), and/or ($S_3$ to $S_1$) at a state transition may be used to encode a logic 1, while counter-clockwise rotations ($S_1$ to $S_3$), ($S_3$ to $S_2$), and/or ($S_2$ to $S_1$) at the state transition may be used to encode a logic 0. Accordingly a bit may be encoded at each transition by controlling whether the signal is "rotating" clockwise or counter-clockwise. For example, a logic 1 may be encoded when the three wires 310a, 310b, 310c transition from phase state $S_1$ to phase state $S_2$ and a logic 0 may be encoded when the three wires 310a, 310b, 310c transition from phase state $S_1$ to phase state $S_3$. In the simple three-wire example depicted, direction of rotation may be easily determined based on which of the three wires 310a, 310b, and 310c is undriven before and after the transition.

Information may also be encoded in the polarity of the driven conductors 310a, 310b, and 310c or direction of current flow between two conductors 310a, 310b, and 310c. Signals 402, 404, and 406 illustrate voltage levels applied to conductors 310a, 310b, and 310c, respectively at each phase state in a three-wire, three-phase link. At any time, a first conductor 310a, 310b, 310c is coupled to a positive voltage (+V, for example), a second conductor 310a, 310b, 310c is coupled to a negative voltage (−V, for example), while the third conductor 310a, 310b, 310c may be open-circuited or otherwise undriven. As such, one polarity encoding state may be determined by the current flow between the first and second conductors 310a, 310b, 310c or the voltage polarities of the first and second conductors 310a, 310b, 310c. In some embodiments, two bits of data may be encoded at each phase transition. A decoder may determine the direction of signal phase rotation to obtain the first bit, and the second bit may be determined based on the polarity difference between two of the signals 402, 404 and 406. The decoder having determined direction of rotation can determine the current phase state and the polarity of the voltage applied between the two active conductors 310a, 310b and/or 310c, or the direction of current flow through the two active conductors 310a, 310b and/or 310c.

In the example of the three-wire, three-phase link described herein, one bit of data may be encoded in the rotation, or phase change in the three-wire, three-phase link, and an additional bit may be encoded in the polarity of two driven wires. Certain embodiments encode more than two bits in each transition of a three-wire, three-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

Figure 5:
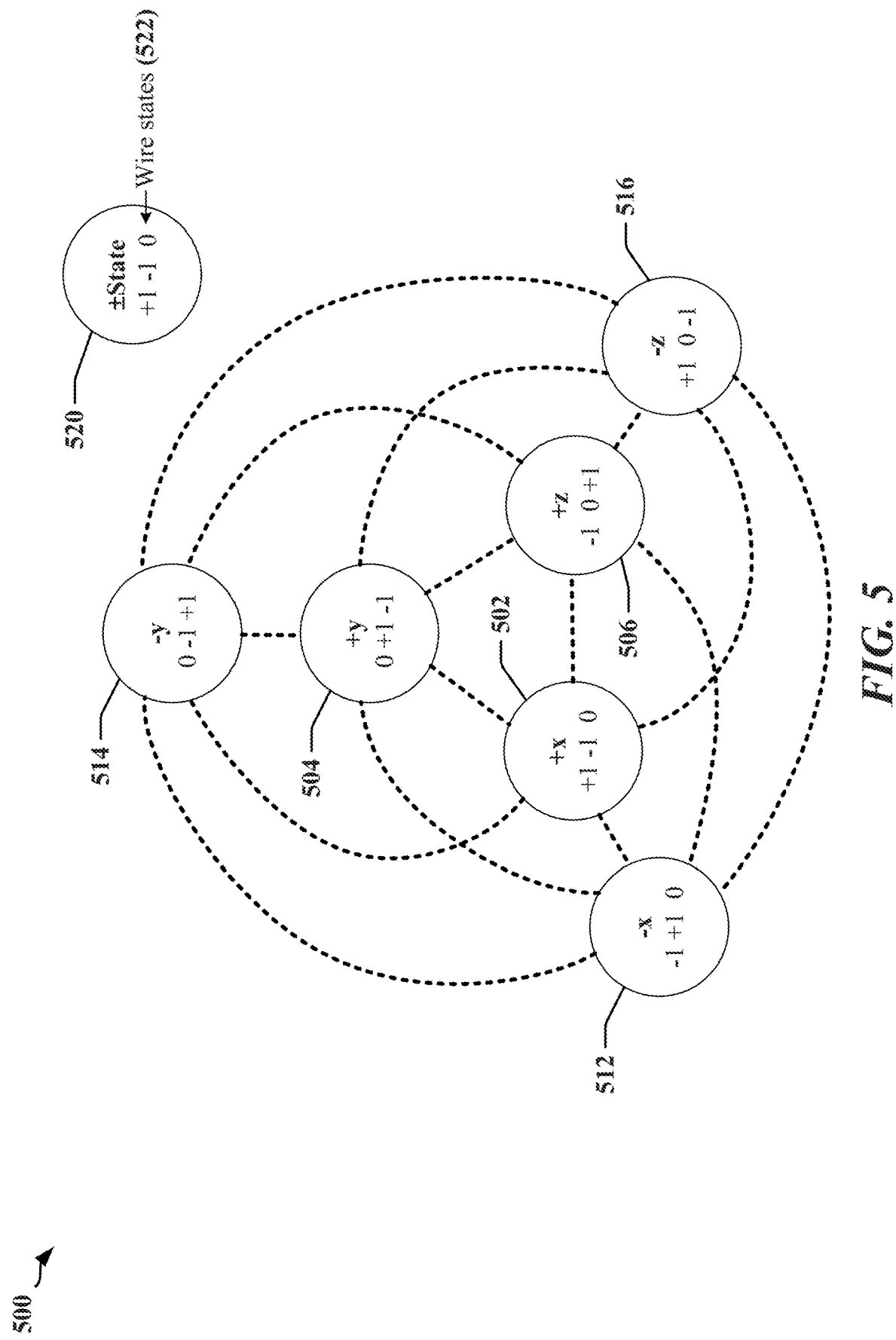
FIG. 5 is a state diagram illustrating state transitions in the example of a 3-wire, 3-phase communication link.

FIG. 5 is a state diagram 500 illustrating 6 states and 30 possible state transitions in the example of a 3-wire, 3-phase communication link. FIG. 5 expands on the state transition diagram 450 in FIG. 4 by depicting all possible states 502, 504, 506, 512, 514 and 516. These states 502, 504, 506, 512, 514 and 516 include positive polarity and negative polarity versions of the phase states $S_1$, $S_2$ and $S_3$ illustrated in the phase transition diagram 450 of FIG. 4. For clarity, the set of phase/polarity states are labeled alphabetically and includes {+x, −x, +y, −y, +z, −z} where, for example, +x and −x represent states with the same phase state but different polarity. As shown in the model state element 520, each state 502, 504, 506, 512, 514 and 516 in the state diagram 500 includes a field of wire states 522 showing the voltage state of signals 402, 404 and 406, which are transmitted on wires 310a, 310b and 310c, respectively. For example, in state 502 (+x) signal 402=+1, signal 404=−1 and signal 406=0. Also shown in FIG. 5 are the 5 possible transition paths between the states 502, 504, 506, 512, 514 and 516, including by way of example, the transition path 524 between −x state 512 and −y state 514.

Figure 6:
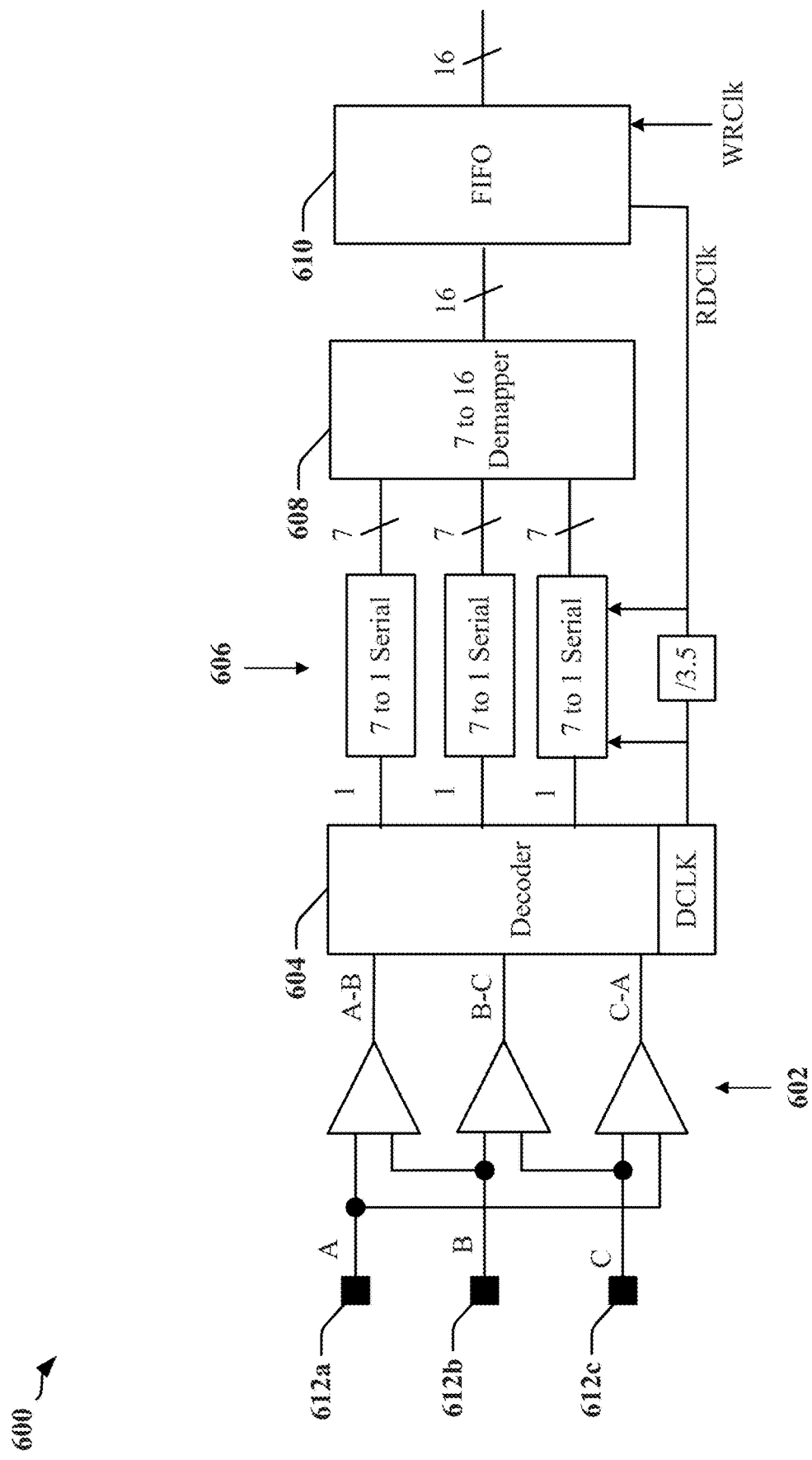
FIG. 6 illustrates a 3-phase polarity data decoder.

FIG. 6 is a block schematic drawing 600 illustrating an example showing certain physical layer (PHY) components in a receiver adapted to connect to a 3-phase interface. Comparators 602 and decoder 604 are configured to provide a digital representation of the state of each of three transmission lines 612a, 612b and 612c, as well as the change in the state of the three transmission lines compared to the state transmitted in the previous symbol period. As can be seen from the illustrated example, the voltage of each conductor 612a, 612b or 612c may be compared to the voltages of the other two conductors 612a, 612b and/or 612c to determine the state of each conductor 612a, 612b or 612c, such that the occurrence of a transition may be detected and decoded by the decoder 604 based on the outputs of the comparators 602. Seven consecutive states are assembled by serial to parallel convertors 606, which produce sets of 7 symbols to be processed by demapper 608 to obtain 16 bits of data that may be buffered in the first-in-first-out module (FIFO) 610.

Figure 7:
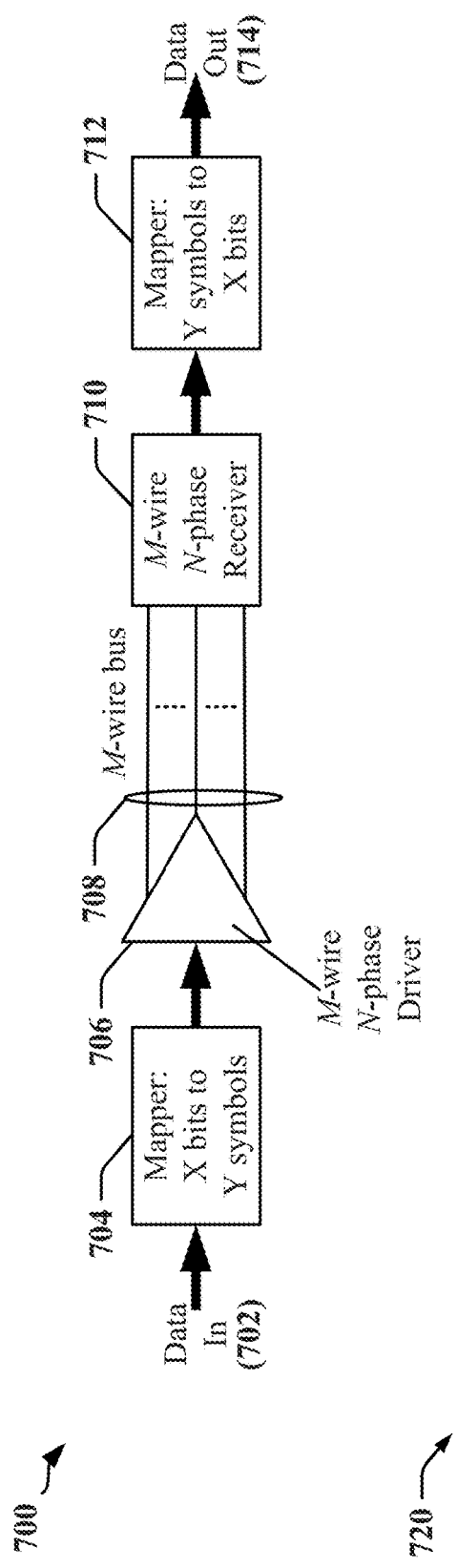
FIG. 7 illustrates a driver for M-wire, N-phase polarity data encoding.

FIG. 7 includes a block schematic diagram 700 illustrating certain aspects of an M-wire, N-phase encoding system and bit encoding capabilities for various values of M and configurations of the M-wire, N-phase encoding system. Data received at a transmitter may be mapped to a number of symbols to be sequentially transmitted over an M-wire bus 708. The mapping scheme may determine a configuration for the M-wire bus 708. In one example, a plurality of connecters in the M-wire bus 708 may carry the same N-phase signal, shifted by a predetermined phase angle. In another example, the M-wire bus 708 may be subdivided into groups of G wires, where each group carries different N-phase signals. In the latter example, a 9-wire bus 708 may be configured as three different 3-wire bus segments. According to certain aspects, the mapper 704 may be adapted to dynamically define the encoding scheme, to reconfigure the M-wire bus 708 and to control the operation of the M-wire, N-phase driver 706. In one example, the mapper 704 may be adapted to reconfigure the M-wire, N-phase encoding system to provide a desired bandwidth and/or to limit power consumption. Thus, the mapper 704 may selectively enable and disable portions of the M-wire bus 708 when demand on data bandwidth is low, and the mapper 704 may enable additional portions of the M-wire bus 708 to obtain increased bandwidth.

At the receiver, N-phase symbols are received and accumulated from the M-wire bus 708, typically over a plurality of transmission clock cycles. The accumulated symbols may then be decoded by a symbol-to-bits mapper 712. Transmit clocks may be derived from one or more portions of the M-wire bus 708 and configuration information may be communicated using a designated group of conductors that provide a primary channel. In the example of the 9-wire bus 708 configured as three different 3-wire bus segments, one bus segment may be identified as the primary channel with a default encoding scheme to be used during power-up and synchronization. Commands communicated over the bus may cause the transmitter and receiver to enter a hibernate stage on one or more of the 3-wire segments.

N-Phase data transfer may use more than three signal wires or other conductors provided in a communication medium. The use of additional signal wires that can be driven simultaneously provides more combinations of states and polarities and allows more bits of data to be encoded at

TABLE 1

| | Wire amplitude | | | Differential Rx output | | | Receiver Digital Output | | |
|---|---|---|---|---|---|---|---|---|---|
| State | A | B | C | A − B | B − C | C − A | Rx_AB | Rx_BC | Rx_CA |
| +x | +V | 0 | +V/2 | +V | −V/2 | −V/2 | 1 | 0 | 0 |
| −x | 0 | +V | +V/2 | −V | +V/2 | +V/2 | 0 | 1 | 1 |
| +y | +V/2 | +V | 0 | −V/2 | +V | −V/2 | 0 | 1 | 0 |
| −y | +V/2 | 0 | +V | +V/2 | −V | +V/2 | 1 | 0 | 1 |
| +z | 0 | +V/2 | +V | −V/2 | −V/2 | +V | 0 | 0 | 1 |
| −z | +V | +V/2 | 0 | +V/2 | +V/2 | −V | 1 | 1 | 0 |

With reference also to FIG. 5, Table 1 illustrates the outputs of the differential receivers 602 for each wire state 522 in the 3-wire 3-phase polarity encoding system. In the example, the wire states 522 may be encoded in the voltage amplitude on the three wires 612a, 612b and 612c such that a +1 state of a wire is represented as a voltage +V volts, a −1 state of the wire is represented as 0 volts and the undriven state is represented or approximated as +V/2 volts. A receiver/decoder may be configured to output a code at the digital output of the receiver for each symbol decoded.

each transition between states. This can significantly improve throughput of the system, while limiting power consumption as opposed to communications links that use multiple differential pairs to transmit data bits, while providing increased bandwidth. Power consumption can be further limited by dynamically configuring the number of active conductors for each transmission.

Figure 8:
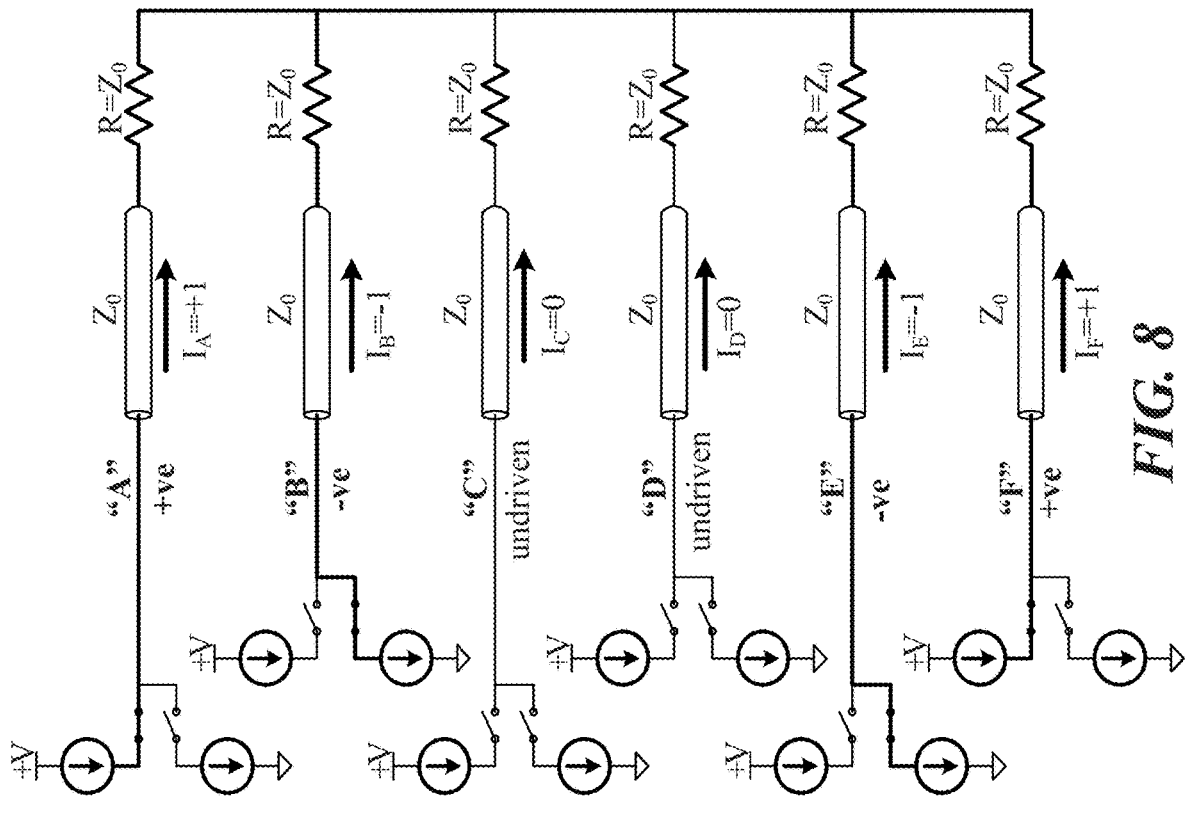
FIG. 8 is a schematic drawing showing a model of an encoder that transmits symbols using 6 wires with 2 pairs of wires driven for each state.

FIG. 8 is a schematic drawing showing a model of an encoder that transmits symbols using 6 wires with 2 pairs of wires driven for each state. The 6 wires may be labeled A through F, such that in one state, wires A and F are driven positive, wires B and E negative, and C and D are undriven (or carry no current). In the example the N-phase signal may have 3 phases. Each phase state can have either a positive or negative polarity. In the illustrative model, each wire may be connected to a positive current source, a negative current source, or no current source. Current flows through a wire having an impedance $Z_0$ that is typically the characteristic impedance of the transmission wire. As shown in FIG. 8, the positive currents are canceled by two negative currents.

For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| | | | | | |
|---|---|---|---|---|---|
| + + − − | + − − + | + − + − | − + − + | − + + − | − − + + |

Accordingly, the total number of different states may be calculated as 15×6=90. To guarantee a transition between successive symbols, 89 states are available for transition from any current state, and the number of bits that may be encoded in each symbol may be calculated as: log 2(89) ≅6.47 bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right)$$

FIG. 7 includes a chart 720 that shows bit encoding for various values of M (i.e. number of wires) and configurations of wires and wire pairs.

In some embodiments, an encoder may be configured to increase the number of wires used for N-phase encoding when increased bandwidth is required. Bandwidth may change when, for example, a video clip is to be displayed to a user of apparatus 100, or when a burst of data is to be transferred between processing circuits and/or memory devices. Changes in bandwidth may also correspond or relate to power control measures as well as specific application needs. For example, the apparatus of FIG. 2 may dynamically reconfigure the links 220 to initiate power-saving measures that may conserve battery lifetime when demand for bandwidth is curtailed.

When increased or decreased bandwidth is required or requested, an encoder may increase or decrease the number of active conductors to be used for N-phase encoding. Such adaptive encoding can enable the power-efficient provision of variable bandwidth. In one example, additional wires can be added in atomic units. An atomic unit may include three wires that employ 3-phase, polarity encoding (described herein). In another example, additional encoding states may be defined by adding pairs of wires to an M-wire, N-phase bus. In another example, additional encoding states may be obtained by adding a single wire, whereby two wires are undriven for each state. Addition of an undriven wire may increase power consumption less than adding a pair of driven wires.

Figure 9:
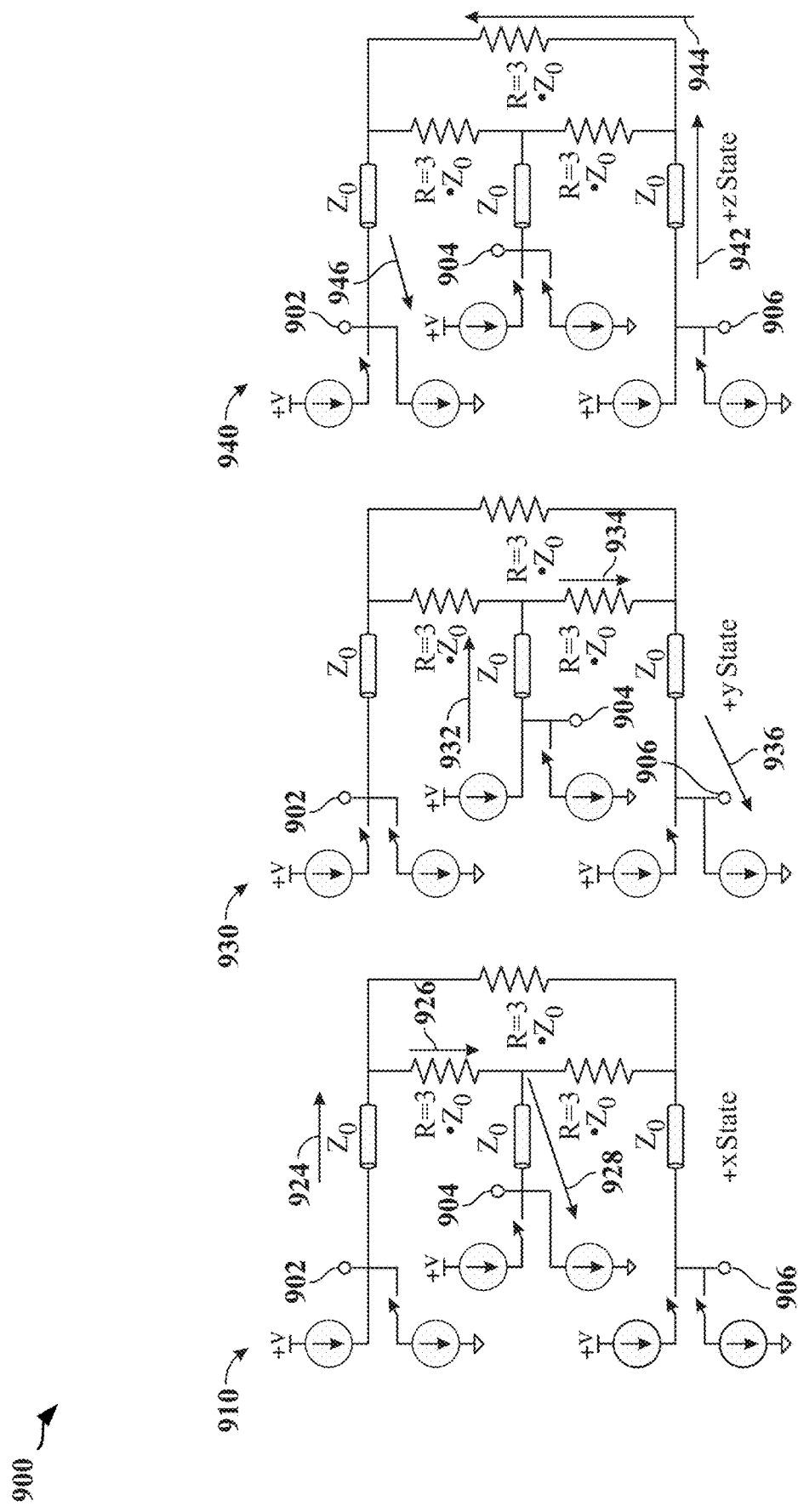
FIG. 9 is a schematic drawing showing a model of a 3-phase polarity encoding circuit.

FIG. 9 illustrates a model of a 3-wire, 3-phase polarity encoding circuit. Current is passed through two of three signal wires through corresponding terminals 902, 904 and/or 906 that may be connected to wires having a characteristic impedance ($Z_0$). In an aspect, no current is passed through the third signal wire. However, in other aspects, a current may be passed through the third signal wire. As discussed herein, each phase state can be defined as having a positive polarity or a negative polarity, although the example in FIG. 9 depicts only the positive polarity condition of each phase state to simplify description. To obtain a "+x" state 910, current is passed 924, 926, 928 from terminal 902 to terminal 904. To obtain a "+y" state 930, current is passed 932, 934, 936 from terminal 904 to terminal 906. To obtain a "+z" state 940, current is passed 942, 944, 946 from terminal 906 to terminal 902. The undriven signal may be pulled towards a neutral voltage by termination resistors at the receiver.

According to certain aspects disclosed herein, an M-wire, N-phase physical layer (N-phase PHY) interface is provided to support a multiphase signal. Referring again to FIG. 4, in one example a 3-phase signal 402, 404, 406 provided on a wire 310*a*, 310*b*, 310*c* is defined by two active signals of opposite polarity and one undriven signal in which no current is transmitted and/or the wire 310*a*, 310*b*, 310*c* is open circuited. A 3-phase PHY may encode and decode the 3-phase signal by causing the undriven signal to transition to a neutral voltage (e.g. 0 volts) at both ends of the transmission line circuit to prevent current flow.

Figure 10:
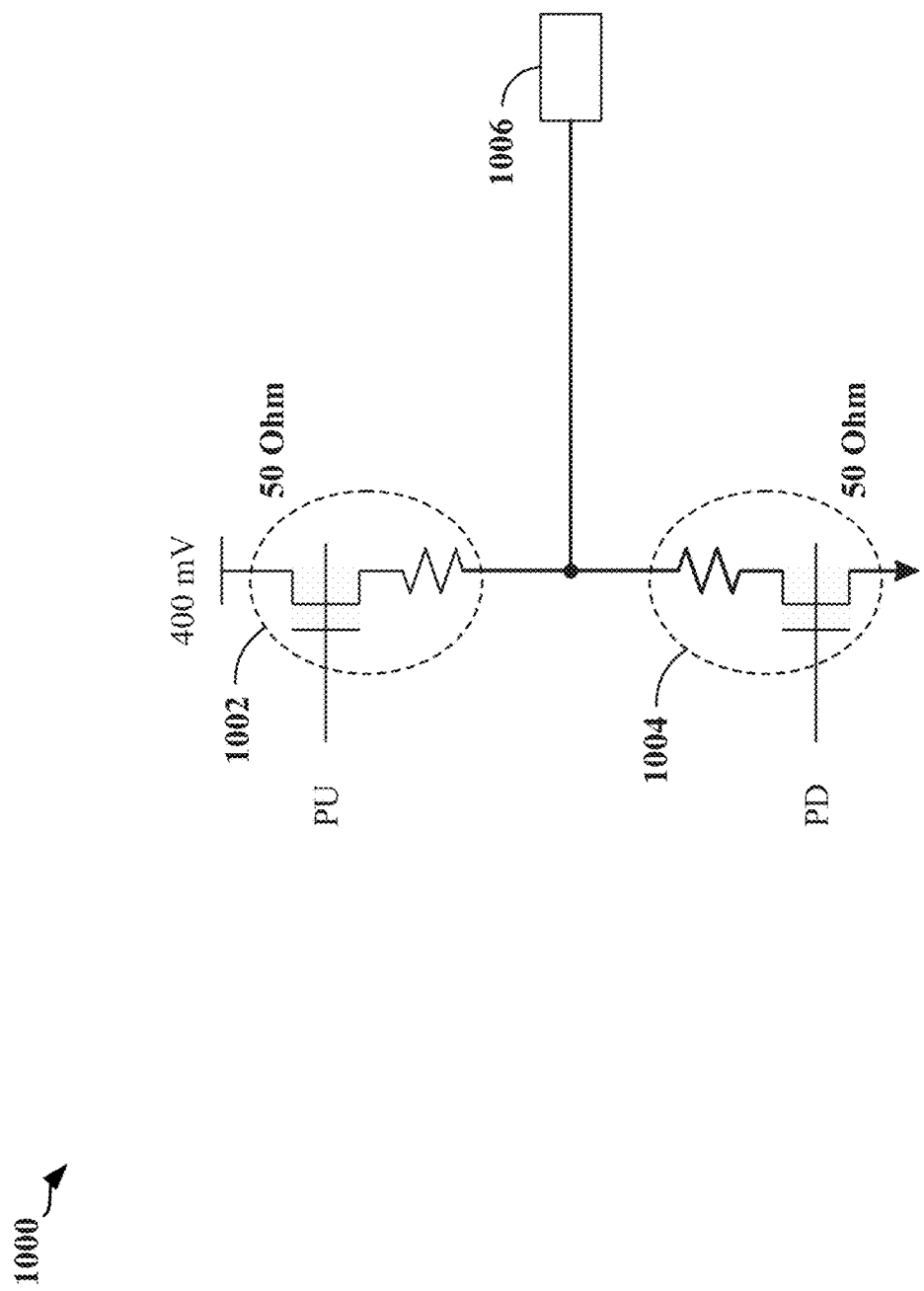
FIG. 10 illustrates an example of a line interface used to drive a signal wire in a 3-phase system.

Exemplary Operating Environment for Driving a Signal Wire in a Three-Phase Communication Link FIG. 10 illustrates an example of a line interface 1000 that may be used to drive a signal wire in a 3-phase PHY. In one example, a transistor 1002 receives a pull-up signal and a transistor 1004 receives a pull-down signal. When the output terminal 1006 is to be driven to an active (+1 or −1) signaling state, one of the transistors 1002 or 1004 is turned on and the output terminal 1006 is actively driven to one signaling state or the other. When the output terminal 1006 is to be undriven and in an inactive (0) signaling state, neither the pull-up nor pull-down control is active and both transistors 1002 and 1004 are turned off. The output terminal 1006 typically settles at the common mode level of driven lines when both transistors 1002 and 1004 are turned off to obtain an inactive (0) signaling state. However, the settling time may result in skew times that are longer for undriven states than for states that are actively driven by a transistor 1002 or 1004. The settling time and corresponding skew time may be improved by terminating the transmission line or the terminal 1006. In one example, a pair of impedances, which may be resistive, or other loads may be provided at the transmitter or at the receiver to cause a signal wire or terminal 1006 to more rapidly acquire a neutral voltage level and to maintain the signal wire or terminal 1006 at the neutral voltage.

A high speed serial interface, such as a C-PHY interface (C-PHY), provides high throughput over bandwidth limited channels for connecting to peripherals, including displays and cameras. C-PHY may use three phase encoding and transmits symbols over three-wire lanes (or trios) to yield an effective transfer of 2.28 bits per symbol. Within a three-wire trio, two of the three wires may be driven to opposite levels (e.g., high level and low level) while a third wire may be terminated to a middle level (common mode level), and the voltages at which the wires are driven change at every symbol.

Traditional C-PHY driver topologies, either do not drive the middle level voltage, or incur an area and power penalty in driving the middle level voltage using additional circuit segments that continue to consume power even after the middle level voltage is achieved. In an aspect, a C-PHY 3-phase transmitter may require a driver to be able to drive a high, low, or middle (common mode) level voltage onto the transmit channel. If the driver is not able to drive the middle (common mode) level voltage, data rates achievable by the driver may be severely limited. Moreover, the driver may be made unusable in lower power applications that do not use receiver-side termination. However, driving the middle level voltage may introduce an additional burden on the driver's design and results in increasing the power and area consumption of the driver. For lower power and performance applications, the additional power is undesirable. Accordingly, to help alleviate this burden, the present disclosure provides for new C-PHY driver topologies that can be used with or without receiver-side trio termination. Utilizing the new C-PHY driver topologies with receiver-side termination enables higher data rate applications while lowering power compared to traditional approaches. Utilizing the new C-PHY driver topologies without receiver-side termination may limit data rates but provides additional power savings.

Figure 11:
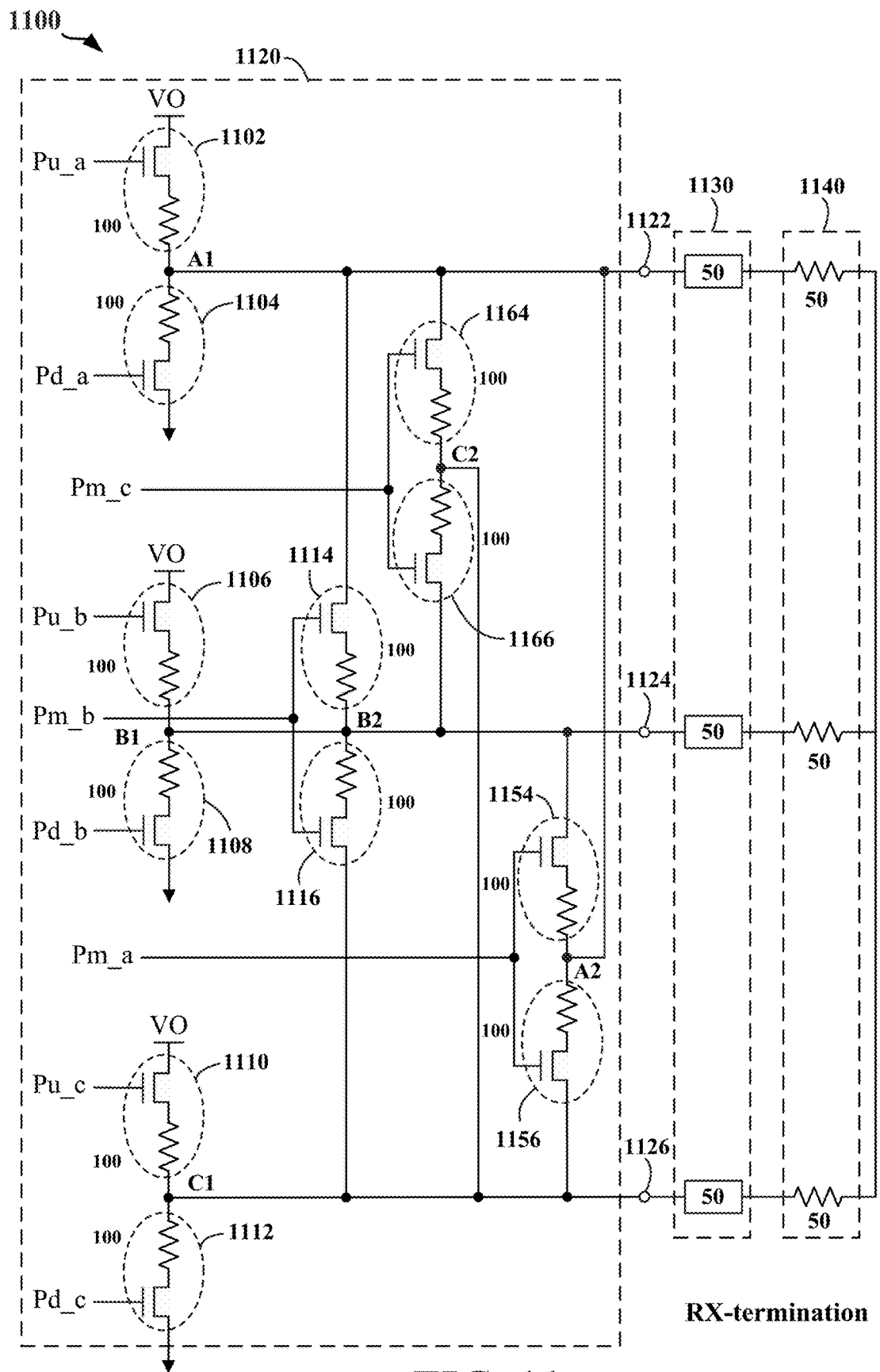
FIG. 11 illustrates a first example of line interfaces used to drive three signal wires in a 3-phase system.
Figure 12:
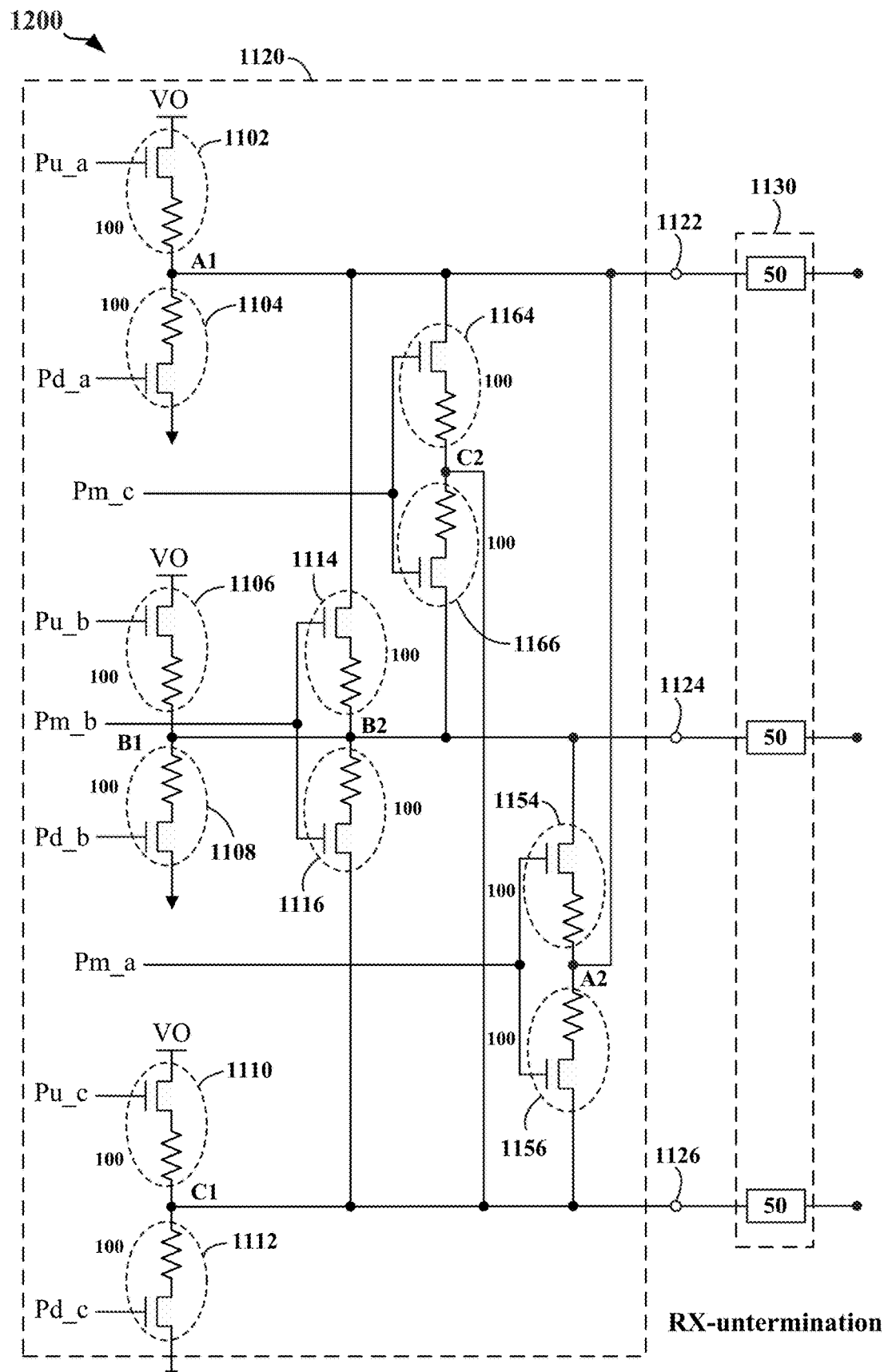
FIG. 12 illustrates a second example of line interfaces used to drive three signal wires in a 3-phase system.

FIG. 11 illustrates a first example 1100 of line interfaces used to drive three signal wires in a 3-phase system. FIG. 12 illustrates a second example 1200 of line interfaces used to drive three signal wires in a 3-phase system. In the first example 1100 of FIG. 11, a voltage mode driver (transmitter) 1120 utilizes receiver (RX)-termination, wherein impedances may be provided at a receiver 1140 to cause transmission lines 1130 or output terminals 1122, 1124, and 1126 to more rapidly acquire a middle level voltage and to maintain the transmission lines 1130 or the output terminals 1122, 1124, and 1126 at the middle level voltage. As shown in FIG. 11, the transmission lines 1130 may have characteristic impedances of 50 Ohms, and the receiver 1140 may terminate the transmission lines 1130 using 50-Ohm impedances. However, termination at the receiver 1140 is not limited to the use of 50-Ohm impedances as various other impedance values may be used in accordance with the present disclosure. The second example 1200 of FIG. 12 may have an architecture that is almost identical to the architecture of the first example 1100 except that the voltage mode driver (transmitter) 1120 does not utilize RX-termination (referred to as "RX-untermination" in FIG. 12). Hence, in the second example 1200, impedances are not provided at a receiver side to cause the transmission lines 1130 (or the output terminals 1122, 1124, and 1126) to more rapidly acquire a middle level voltage and/or maintain the transmission lines 1130 (or the output terminals 1122, 1124, and 1126) at the middle level voltage.

For both the first example 1100 (RX-termination case) and the second example 1200 (RX-untermination case), the line interfaces that drive the three signal wires (i.e., output terminals 1122, 1124, and 1126) operate in a similar way. Therefore, the description below regarding the driving of the output terminals by the line interfaces apply to both the first example 1100 and the second example 1200.

In an aspect, the voltage mode driver 1120 uses a pull-up segment (or driver) and a pull-down segment (or driver) to drive an associated output terminal toward a high level voltage and a low level voltage. The voltage mode driver 1120 further uses additional segments (or drivers) dedicated to driving associated output terminals toward a middle level voltage. The additional segments pull voltages up and/or down between a first voltage signal used to drive a first output terminal other than an associated output terminal toward a high/low level voltage and a second voltage signal used to drive a second output terminal other than the associated output terminal toward a high/low level voltage.

The voltage mode driver 1120 may include a segment (or driver) A1 for driving a first output terminal 1122 toward a high level voltage and a low level voltage. The segment A1 includes a pull-up transistor 1102 configured to receive a first pull-up signal (Pu_a) and a pull-down transistor 1104 configured to receive a first pull-down signal (Pd_a). When the first output terminal 1122 is to be driven toward the high level voltage (e.g., +1 signaling state), the segment A1 is configured to output a voltage signal corresponding to the high level voltage by turning on the pull-up transistor 1102 and turning off the pull-down transistor 1104, thus causing the first output terminal 1122 to be actively driven toward the high level voltage. When the first output terminal 1122 is to be driven toward the low level voltage (e.g., −1 signaling state), the segment A1 is configured to output a voltage signal corresponding to the low level voltage by turning on the pull-down transistor 1104 and turning off the pull-up transistor 1102, thus causing the first output terminal 1122 to be actively driven toward the low level voltage. When the first output terminal 1122 is to be driven toward the middle level voltage (e.g., 0 signaling state), both the pull-up transistor 1102 and the pull-down transistor 1104 are turned off.

The voltage mode driver 1120 may further include a segment (or driver) B1 for driving a second output terminal 1124 toward a high level voltage and a low level voltage. The segment B1 includes a pull-up transistor 1106 configured to receive a second pull-up signal (Pu_b) and a pull-down transistor 1108 configured to receive a second pull-down signal (Pd_b). When the second output terminal 1124 is to be driven toward the high level voltage (e.g., +1 signaling state), the segment B1 is configured to output a voltage signal corresponding to the high level voltage by turning on the pull-up transistor 1106 and turning off the pull-down transistor 1108, thus causing the second output terminal 1124 to be actively driven toward the high level voltage. When the second output terminal 1124 is to be driven toward the low level voltage (e.g., −1 signaling state), the segment B1 is configured to output a voltage signal corresponding to the low level voltage by turning on the pull-down transistor 1108 and turning off the pull-up transistor 1106, thus causing the second output terminal 1124 to be actively driven toward the low level voltage. When the second output terminal 1124 is to be driven toward the middle level voltage (e.g., 0 signaling state), both the pull-up transistor 1106 and the pull-down transistor 1108 are turned off.

The voltage mode driver 1120 may also include a segment (or driver) C1 for driving a third output terminal 1126 toward a high level voltage and a low level voltage. The segment C1 includes a pull-up transistor 1110 configured to receive a third pull-up signal (Pu_c) and a pull-down transistor 1112 configured to receive a third pull-down signal (Pd_c). When the third output terminal 1126 is to be driven toward the high level voltage (e.g., +1 signaling state), the segment C1 is configured to output a voltage signal corresponding to the high level voltage by turning on the pull-up transistor 1110 and turning off the pull-down transistor 1112, thus causing the third output terminal 1126 to be actively driven toward the high level voltage. When the third output terminal 1126 is to be driven toward the low level voltage (e.g., −1 signaling state), the segment C1 is configured to output a voltage signal corresponding to the low level voltage by turning on the pull-down transistor 1112 and turning off the pull-up transistor 1110, thus causing the third output terminal 1126 to be actively driven toward the low level voltage. When the third output terminal 1126 is to be driven toward the middle level voltage (e.g., 0 signaling state), both the pull-up transistor 1110 and the pull-down transistor 1112 are turned off.

The voltage mode driver 1120 may further include additional segments (or drivers) dedicated to driving respective output terminals toward the middle level voltage. For example, segment (or driver) A2 drives the first output terminal 1122 toward the middle level voltage, segment (or driver) B2 drives the second output terminal 1124 toward the middle level voltage, and segment (or driver) C2 drives the third output terminal 1126 toward the middle level voltage.

As an example, an operation for driving an output terminal toward the middle level voltage will first be described with respect to the segment B2 configured to drive the second output terminal 1124 toward the middle level voltage. Notably, the operation for driving the first output terminal 1122 using the segment A2 and the operation for driving the third output terminal 1126 using the segment C2 is similar to the described operation for driving the second output terminal 1124 using the segment B2.

The segment B2 is configured to receive a pull-middle signal (Pm_b). The segment B2 includes a transistor 1114 configured to output a voltage signal based on a voltage signal received from the segment A1 and a transistor 1116 configured to output a voltage signal based on a voltage signal received from the segment C1. When the second output terminal 1124 is to be driven toward the middle level voltage (e.g., 0 signaling state), the transistor 1114 receives from the segment A1 the voltage signal intended to drive the first output terminal 1122 toward the high voltage level or low voltage level. Concurrently, the transistor 1116 receives from the segment C1 the voltage signal intended to drive the third output terminal 1126 toward the high voltage level or low voltage level. Upon receiving the voltage signals from the segment A1 and the segment C1, the transistor 1114 and the transistor 1116 are respectively activated (turned on) and together drive the second output terminal 1124 toward a voltage level within a voltage range bounded by the high voltage level (related to the first output terminal 1122 or the third output terminal 1126) and the low voltage level (related to the first output terminal 1122 or the third output terminal 1126). In an aspect, the segment B2 is turned off when the segment B1 drives the second output terminal 1124 toward a high voltage level or a low voltage level.

The segment A2 is configured to receive a pull-middle signal (Pm_a). The segment A2 includes a transistor 1154 configured to output a voltage signal based on a voltage signal received from the segment B1 and a transistor 1156 configured to output a voltage signal based on a voltage signal received from the segment C1. When the first output terminal 1122 is to be driven toward the middle level voltage (e.g., 0 signaling state), the transistor 1154 receives from the segment B1 the voltage signal intended to drive the second output terminal 1124 toward the high voltage level or low voltage level. Concurrently, the transistor 1156 receives from the segment C1 the voltage signal intended to drive the third output terminal 1126 toward the high voltage level or low voltage level. Upon receiving the voltage signals from the segment B1 and the segment C1, the transistor 1154 and the transistor 1156 are respectively activated (turned on) and together drive the first output terminal 1122 toward a voltage level within a voltage range bounded by the high voltage level (related to the second output terminal 1124 or the third output terminal 1126) and the low voltage level (related to the second output terminal 1124 or the third output terminal 1126). In an aspect, the segment A2 is turned off when the segment A1 drives the first output terminal 1122 toward a high voltage level or a low voltage level.

The segment C2 is configured to receive a pull-middle signal (Pm_c). The segment C2 includes a transistor 1164 configured to output a voltage signal based on a voltage signal received from the segment A1 and a transistor 1166 configured to output a voltage signal based on a voltage signal received from the segment B1. When the third output terminal 1126 is to be driven toward the middle level voltage (e.g., 0 signaling state), the transistor 1164 receives from the segment A1 the voltage signal intended to drive the first output terminal 1122 toward the high voltage level or low voltage level. Concurrently, the transistor 1166 receives from the segment B1 the voltage signal intended to drive the second output terminal 1124 toward the high voltage level or low voltage level. Upon receiving the voltage signals from the segment A1 and the segment B1, the transistor 1164 and the transistor 1166 are respectively activated (turned on) and together drive the third output terminal 1126 toward a voltage level within a voltage range bounded by the high voltage level (related to the first output terminal 1122 or the second output terminal 1124) and the low voltage level (related to the first output terminal 1122 or the second output terminal 1124). In an aspect, the segment C2 is turned off when the segment C1 drives the third output terminal 1126 toward a high voltage level or a low voltage level.

In view of the disclosure above, because a source resistance is achieved using a split source termination topology, each individual driver segment may have a higher resistance resulting in area savings. Additionally, by implementing the split source termination topology, and utilizing two output wire level voltages to drive an output terminal toward a middle level voltage (instead of a voltage supply rail), an average current consumed by the driver is reduced, thus providing power savings. Moreover, because the middle level voltage is also being created at a receiver termination common mode, the current consumed for driving the output terminal to the middle level voltage diminishes as a common mode voltage stabilizes at both the transmitter and receiver. A further advantage of the above-described voltage mode driver is that a higher supply voltage can be used by selecting different pull-up and pull-down resistances. This enables an architecture that may forgo a low dropout (LDO) regulator, thus providing further area and power savings. Typically, the LDO regulator is used to provide a low level voltage supply (0.4) required for C-PHY signaling. Being able to use higher voltage supplies while maintaining the signaling requirements alleviates the need for the LDO regulator.

Figure 13:
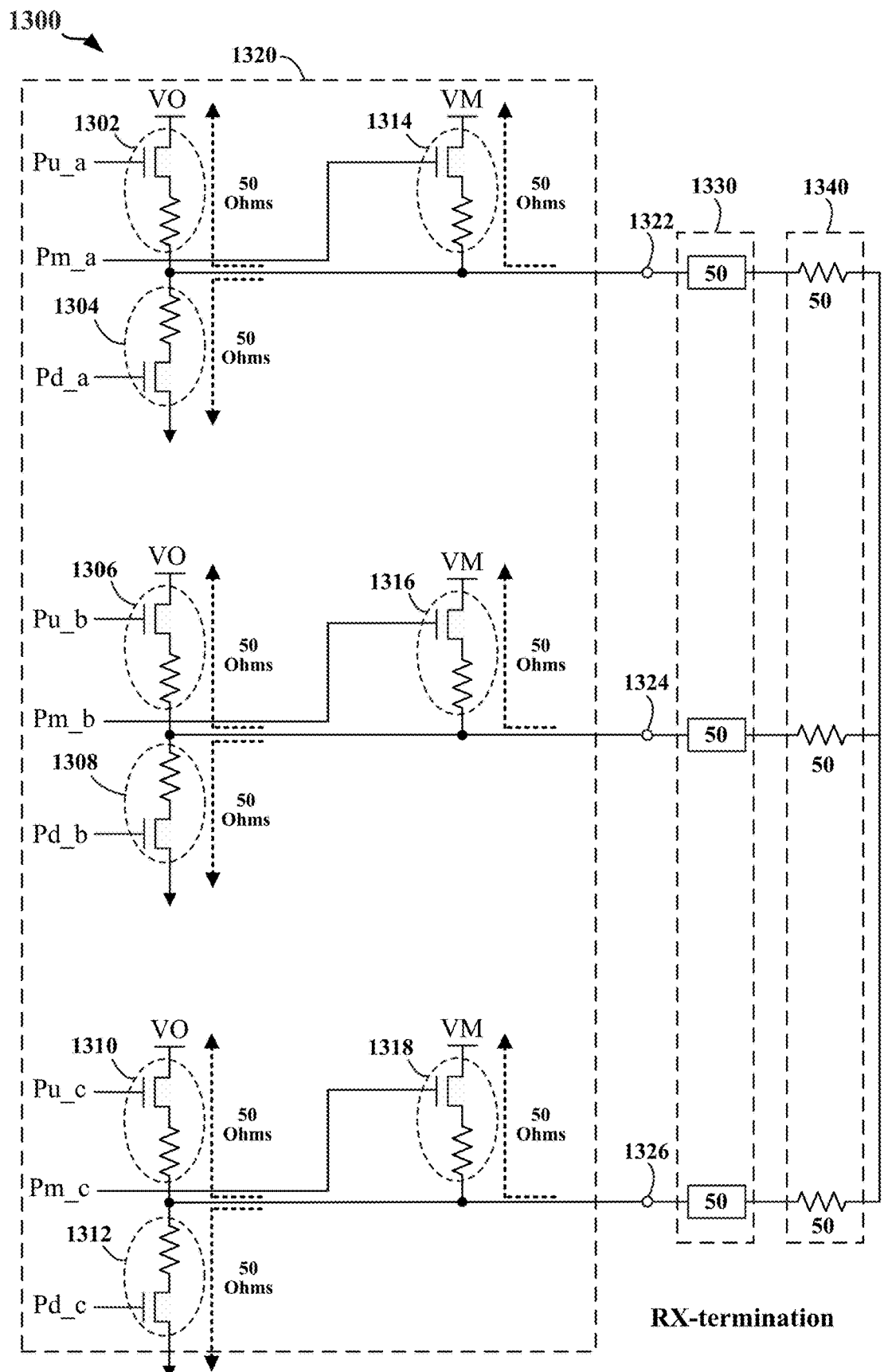
FIG. 13 illustrates a third example of line interfaces used to drive three signal wires in a 3-phase system.
Figure 14:
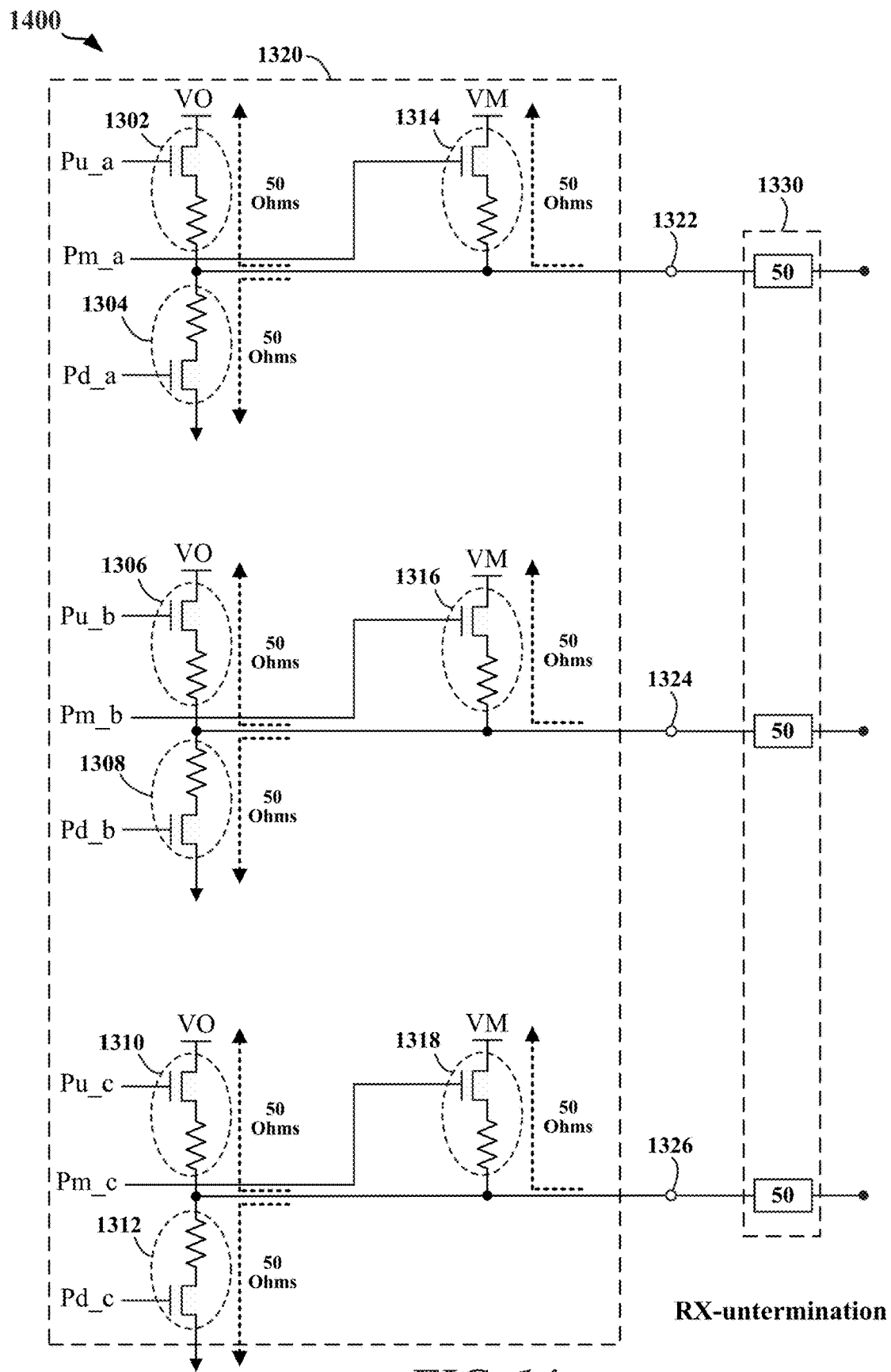
FIG. 14 illustrates a fourth example of line interfaces used to drive three signal wires in a 3-phase system.

FIG. 13 illustrates a third example 1300 of line interfaces used to drive three signal wires in a 3-phase system. FIG. 14 illustrates a fourth example 1400 of line interfaces used to drive three signal wires in a 3-phase system. In the third example 1300 of FIG. 13, a voltage mode driver (transmitter) 1320 utilizes receiver (RX)-termination, wherein impedances may be provided at a receiver 1340 to cause transmission lines 1330 or output terminals 1322, 1324, and 1326 to more rapidly acquire a middle level voltage and to maintain the transmission lines 1330 or the output terminals 1322, 1324, and 1326 at the middle level voltage. As shown in FIG. 13, the transmission lines 1330 may have characteristic impedances of 50 Ohms, and the receiver 1340 may terminate the transmission lines 1330 using 50-Ohm impedances. However, termination at the receiver 1340 is not limited to the use of 50-Ohm impedances as various other impedance values may be used in accordance with the present disclosure. The fourth example 1400 of FIG. 14 may have an architecture that is almost identical to the architecture of the third example 1300 except that the voltage mode driver (transmitter) 1320 does not utilize RX-termination (referred to as "RX-untermination" in FIG. 14). Hence, in the fourth example 1400, impedances are not provided at a receiver side to cause the transmission lines 1330 (or the output terminals 1322, 1324, and 1326) to more rapidly acquire a middle level voltage and/or maintain the transmission lines 1330 (or the output terminals 1322, 1324, and 1326) at the middle level voltage.

For both the third example 1300 (RX-termination case) and the fourth example 1400 (RX-untermination case), the line interfaces that drive the three signal wires (i.e., output terminals 1322, 1324, and 1326) operate in a similar way. Therefore, the driving of the output terminals by the line interfaces will be described with respect to the third example 1300. However, the description may also apply to the fourth example 1400.

In an aspect, the voltage mode driver 1320 uses a pull-up segment (or driver) and a pull-down segment (or driver) to drive an associated output terminal toward a high level voltage and a low level voltage. The voltage mode driver 1320 further uses an additional segment (or driver) dedicated to driving the associated output terminal toward a middle level voltage. The middle level voltage driven by the additional segment may be derived from a same voltage supply rail used by the pull-up segment for driving the associated output terminal toward the high level voltage.

The voltage mode driver 1320 may include a first pull-up transistor 1302 for driving a first output terminal 1322 toward a high level voltage based on a received first pull-up signal (Pu_a) and a first pull-down transistor 1304 for driving the first output terminal 1322 toward a low level voltage based on a received first pull-down signal (Pd_a). When the first output terminal 1322 is to be driven toward the high level voltage (e.g., +1 signaling state), the first pull-up transistor 1302 is turned on and the first pull-down transistor 1304 is turned off, thus causing the first output terminal 1322 to be actively driven toward the high level voltage. When the first output terminal 1322 is to be driven toward the low level voltage (e.g., −1 signaling state), the first pull-down transistor 1304 is turned on and the first pull-up transistor 1302 is turned off, thus causing the first output terminal 1322 to be actively driven toward the low level voltage. When the first output terminal 1322 is to be driven toward the middle level voltage (e.g., 0 signaling state), both the first pull-up transistor 1302 and the first pull-down transistor 1304 are turned off. In an aspect, a total equivalent impedance of a pull-up segment that includes the first pull-up transistor 1302 and a resistor coupled to the first pull-up transistor 1302 is equal to 50 Ohms, as shown in FIGS. 13 and 14. More specifically, the total equivalent impedance of an entire path of the pull-up segment, which may include a resistance of an interconnect between a voltage supply rail supplying a voltage VO and the first pull-up transistor 1302, inherent source resistance from the voltage supply rail itself, a resistance of the coupled resistor, and any parasitic resistance, is equal to 50 Ohms. In another aspect, a total equivalent impedance of a pull-down segment that includes the first pull-down transistor 1304 and a resistor coupled to the first pull-down transistor 1304 is equal to 50 Ohms, as shown in FIGS. 13 and 14. More specifically, the total equivalent impedance of an entire path of the pull-down segment, which may include a resistance of an interconnect between a ground node and the first pull-down transistor 1304, inherent source resistance from the voltage supply rail supplying the voltage VO, a resistance of the coupled resistor, and any parasitic resistance, is equal to 50 Ohms.

The voltage mode driver 1320 may also include a second pull-up transistor 1306 for driving a second output terminal 1324 toward a high level voltage based on a received second pull-up signal (Pu_b) and a second pull-down transistor 1308 for driving the second output terminal 1324 toward a low level voltage based on a received second pull-down signal (Pd_b). When the second output terminal 1324 is to be driven toward the high level voltage (e.g., +1 signaling state), the second pull-up transistor 1306 is turned on and the second pull-down transistor 1308 is turned off, thus causing the second output terminal 1324 to be actively driven toward the high level voltage. When the second output terminal 1324 is to be driven toward the low level voltage (e.g., −1 signaling state), the second pull-down transistor 1308 is turned on and the second pull-up transistor 1306 is turned off, thus causing the second output terminal 1324 to be actively driven toward the low level voltage. When the second output terminal 1324 is to be driven toward the middle level voltage (e.g., 0 signaling state), both the second pull-up transistor 1306 and the second pull-down transistor 1308 are turned off. In an aspect, a total equivalent impedance of a pull-up segment that includes the second pull-up transistor 1306 and a resistor coupled to the second pull-up transistor 1306 is equal to 50 Ohms, as shown in FIGS. 13 and 14. More specifically, the total equivalent impedance of an entire path of the pull-up segment, which may include a resistance of an interconnect between a voltage supply rail supplying a voltage VO and the second pull-up transistor

1306, inherent source resistance from the voltage supply rail itself, a resistance of the coupled resistor, and any parasitic resistance, is equal to 50 Ohms. In another aspect, a total equivalent impedance of a pull-down segment that includes the second pull-down transistor 1308 and a resistor coupled to the second pull-down transistor 1308 is equal to 50 Ohms, as shown in FIGS. 13 and 14. More specifically, the total equivalent impedance of an entire path of the pull-down segment, which may include a resistance of an interconnect between a ground node and the second pull-down transistor 1308, inherent source resistance from the voltage supply rail supplying the voltage VO, a resistance of the coupled resistor, and any parasitic resistance, is equal to 50 Ohms.

The voltage mode driver 1320 may further include a third pull-up transistor 1310 for driving a third output terminal 1326 toward a high level voltage based on a received third pull-up signal (Pu_c) and a third pull-down transistor 1312 for driving the third output terminal 1326 toward a low level voltage based on a received third pull-down signal (Pd_c). When the third output terminal 1326 is to be driven toward the high level voltage (e.g., +1 signaling state), the third pull-up transistor 1310 is turned on and the third pull-down transistor 1312 is turned off, thus causing the third output terminal 1326 to be actively driven toward the high level voltage. When the third output terminal 1326 is to be driven toward the low level voltage (e.g., −1 signaling state), the third pull-down transistor 1312 is turned on and the third pull-up transistor 1310 is turned off, thus causing the third output terminal 1326 to be actively driven toward the low level voltage. When the third output terminal 1326 is to be driven toward the middle level voltage (e.g., 0 signaling state), both the third pull-up transistor 1310 and the third pull-down transistor 1312 are turned off. In an aspect, a total equivalent impedance of a pull-up segment that includes the third pull-up transistor 1310 and a resistor coupled to the third pull-up transistor 1310 is equal to 50 Ohms, as shown in FIGS. 13 and 14. More specifically, the total equivalent impedance of an entire path of the pull-up segment, which may include a resistance of an interconnect between a voltage supply rail supplying a voltage VO and the third pull-up transistor 1302, inherent source resistance from the voltage supply rail itself, a resistance of the coupled resistor, and any parasitic resistance, is equal to 50 Ohms. In another aspect, a total equivalent impedance of a pull-down segment that includes the third pull-down transistor 1312 and a resistor coupled to the third pull-down transistor 1312 is equal to 50 Ohms, as shown in FIGS. 13 and 14. More specifically, the total equivalent impedance of an entire path of the pull-down segment, which may include a resistance of an interconnect between a ground node and the third pull-down transistor 1312, inherent source resistance from the voltage supply rail supplying the voltage VO, a resistance of the coupled resistor, and any parasitic resistance, is equal to 50 Ohms.

The voltage mode driver 1320 may further include additional segments (or drivers) dedicated to driving respective output terminals toward the middle level voltage. For example, a first pull-middle transistor 1314 drives the first output terminal 1322 toward the middle level voltage, a second pull-middle transistor 1316 drives the second output terminal 1324 toward the middle level voltage, and a third pull-middle transistor 1318 drives the third output terminal 1326 toward the middle level voltage.

As an example, an operation for driving an output terminal toward the middle level voltage will be first described with respect to the first pull-middle transistor 1314 configured to drive the first output terminal 1322 toward the middle level voltage. Notably, the operation for driving the second output terminal 1324 using the second pull-middle transistor 1316 and the operation for driving the third output terminal 1326 using the third pull-middle transistor 1318 is similar to the described operation for driving the first output terminal 1322 using the first pull-middle transistor 1314.

The first pull-middle transistor 1314 is configured to receive a first pull-middle signal (Pm_a). When the first output terminal 1322 is to be driven toward the middle level voltage (e.g., 0 signaling state) based on the Pm_a, the first pull-middle transistor 1314, sourced by a supply voltage VM, drives the first output terminal 1322 toward a voltage level within a voltage range bounded by the high voltage level and the low voltage level. In an aspect, the first pull-middle transistor 1314 is turned off when the first pull-up transistor 1302 drives the first output terminal 1322 toward the high voltage level or when the first pull-down transistor 1304 drives the first output terminal 1322 toward the low voltage level. In an aspect, the supply voltage VM used to source the first pull-middle transistor 1314 is supplied/derived from a same voltage supply rail that supplies a voltage VO used to source the first pull-up transistor 1302. Hence, a voltage regulator that regulates the voltage VM supplied to the first pull-middle transistor 1314 also regulates the voltage VO supplied to the first pull-up transistor 1302. In an aspect, a total equivalent impedance of a pull-middle segment that includes the first pull-middle transistor 1314 and a resistor coupled to the first pull-middle transistor 1314 is equal to 50 Ohms, as shown in FIGS. 13 and 14. More specifically, the total equivalent impedance of an entire path of the pull-middle segment, which may include a resistance of an interconnect between a voltage supply rail supplying a voltage VM and the first pull-middle transistor 1314, inherent source resistance from the voltage supply rail itself, a resistance of the coupled resistor, and any parasitic resistance, is equal to 50 Ohms.

The second pull-middle transistor 1316 is configured to receive a second pull-middle signal (Pm_b). When the second output terminal 1324 is to be driven toward the middle level voltage (e.g., 0 signaling state) based on the Pm_b, the second pull-middle transistor 1316, sourced by a supply voltage VM, drives the second output terminal 1324 toward a voltage level within a voltage range bounded by the high voltage level and the low voltage level. In an aspect, the second pull-middle transistor 1316 is turned off when the second pull-up transistor 1306 drives the second output terminal 1324 toward the high voltage level or when the second pull-down transistor 1308 drives the second output terminal 1324 toward the low voltage level. In an aspect, the supply voltage VM used to source the second pull-middle transistor 1316 is supplied/derived from a same voltage supply rail that supplies a voltage VO used to source the second pull-up transistor 1306. Hence, a voltage regulator that regulates the voltage VM supplied to the second pull-middle transistor 1316 also regulates the voltage VO supplied to the second pull-up transistor 1306. In an aspect, a total equivalent impedance of a pull-middle segment that includes the second pull-middle transistor 1316 and a resistor coupled to the second pull-middle transistor 1316 is equal to 50 Ohms, as shown in FIGS. 13 and 14. More specifically, the total equivalent impedance of an entire path of the pull-middle segment, which may include a resistance of an interconnect between a voltage supply rail supplying a voltage VM and the second pull-middle transistor 1314, inherent source resistance from the voltage supply rail itself, a resistance of the coupled resistor, and any parasitic resistance, is equal to 50 Ohms.

The third pull-middle transistor 1318 is configured to receive a third pull-middle signal (Pm_c). When the third output terminal 1326 is to be driven toward the middle level voltage (e.g., 0 signaling state) based on the Pm_c, the third pull-middle transistor 1318, sourced by a supply voltage VM, drives the third output terminal 1326 toward a voltage level within a voltage range bounded by the high voltage level and the low voltage level. In an aspect, the third pull-middle transistor 1318 is turned off when the third pull-up transistor 1310 drives the third output terminal 1326 toward the high voltage level or when the third pull-down transistor 1312 drives the third output terminal 1326 toward the low voltage level. In an aspect, the supply voltage VM used to source the third pull-middle transistor 1318 is supplied/derived from a same voltage supply rail that supplies a voltage VO used to source the third pull-up transistor 1310. Hence, a voltage regulator that regulates the voltage VM supplied to the third pull-middle transistor 1318 also regulates the voltage VO supplied to the third pull-up transistor 1310. In an aspect, a total equivalent impedance of a pull-middle segment that includes the third pull-middle transistor 1318 and a resistor coupled to the first pull-middle transistor 1314 is equal to 50 Ohms, as shown in FIGS. 13 and 14. More specifically, the total equivalent impedance of an entire path of the pull-middle segment, which may include a resistance of an interconnect between a voltage supply rail supplying a voltage VM and the third pull-middle transistor 1316, inherent source resistance from the voltage supply rail itself, a resistance of the coupled resistor, and any parasitic resistance, is equal to 50 Ohms.

Figure 15:
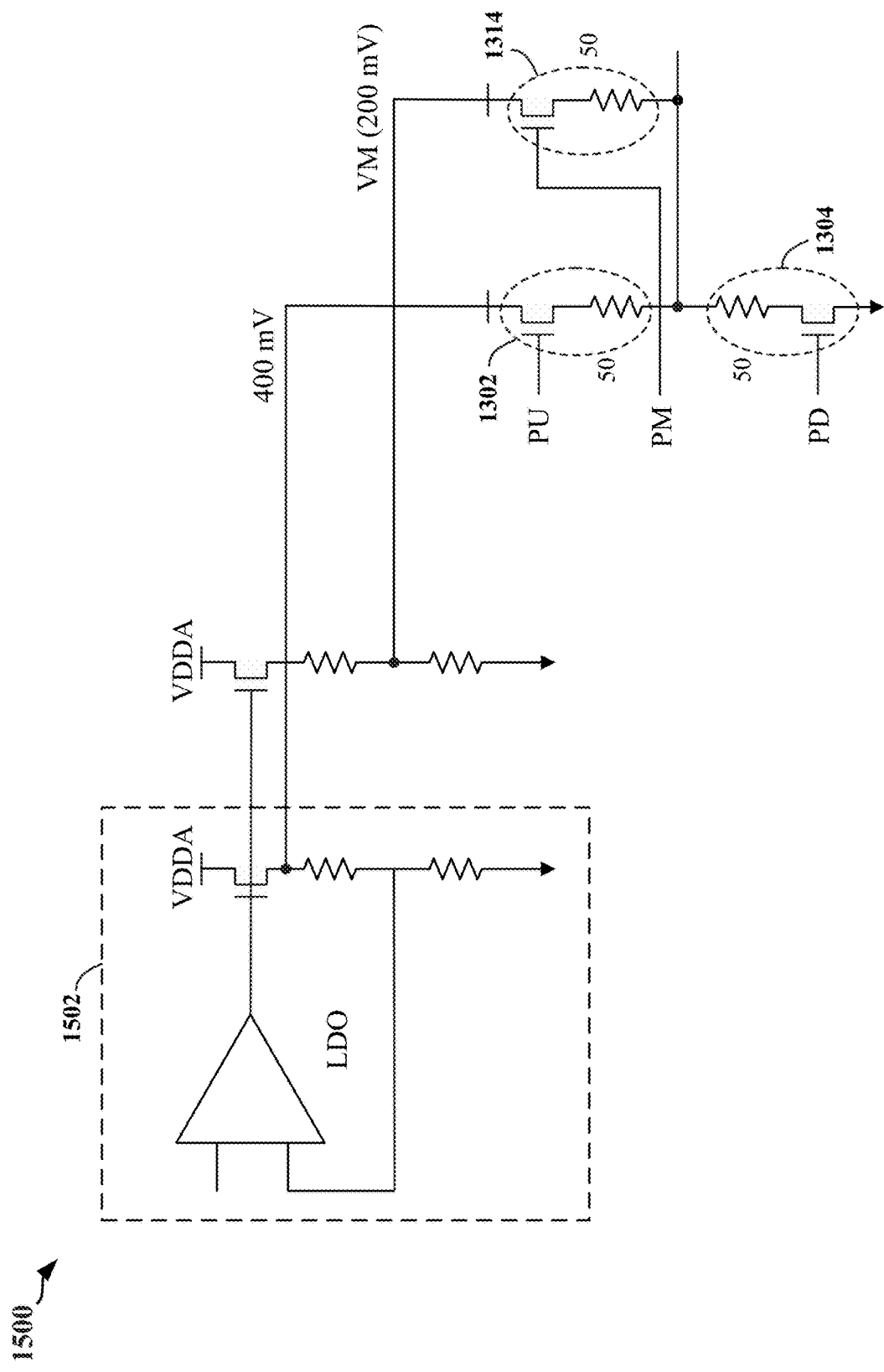
FIG. 15 illustrates a first example of an LDO regulator in operation with a pull-up transistor and a pull-middle transistor.
Figure 16:
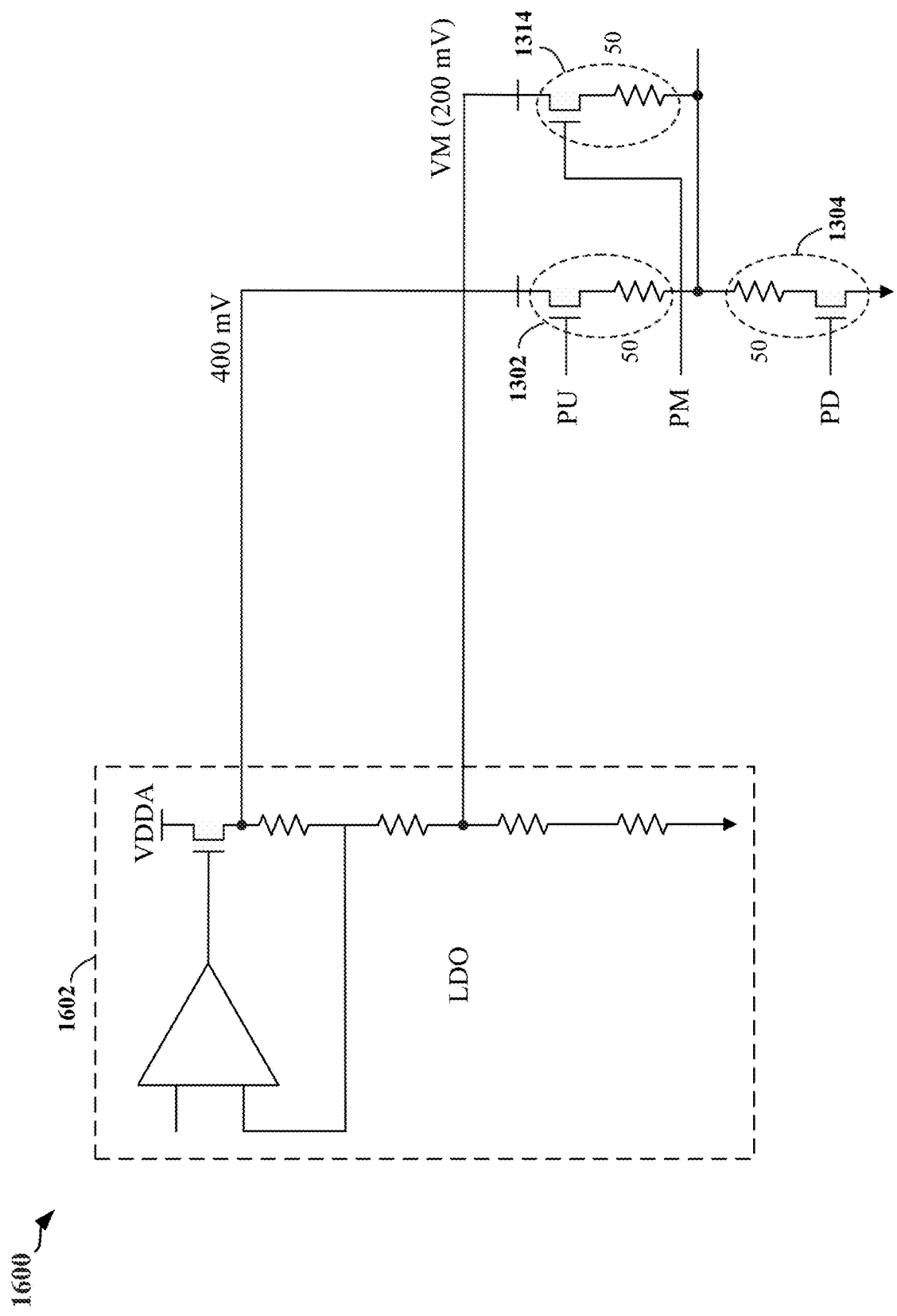
FIG. 16 illustrates a second example of an LDO regulator in operation with a pull-up transistor and a pull-middle transistor.

FIG. 15 illustrates a first example 1500 of an LDO regulator in operation with a pull-up transistor and a pull-middle transistor. FIG. 16 illustrates a second example 1600 of an LDO regulator in operation with the pull-up transistor and the pull-middle transistor. In the first example 1500, an LDO regulator 1502 regulates a voltage supplied to the first pull-up transistor 1302 but does not regulate a voltage VM supplied to the first pull-middle transistor 1314. According to the first example 1500, the voltage VM supplied to the first pull-middle transistor 1314 is received via a supply branch that is a duplicate of a branch used by the LDO regulator 1502 to regulate the voltage supplied to the first pull-up transistor 1302. In the second example 1600, an LDO regulator 1602 regulates both the voltage supplied to the first pull-up transistor 1302 and the voltage VM supplied to the first pull-middle transistor 1314. According to the second example 1600, the voltage VM supplied to the first pull-middle transistor 1314 is received via a same supply branch used by the LDO regulator 1602 to regulate the voltage supplied to the first pull-up transistor 1302.

In view of the disclosure above, a voltage driven by a pull-middle segment (transistor/driver) is derived from a same voltage supply rail supplying a voltage used by a pull-up segment (transistor/driver) for driving an output terminal toward a high level voltage. Accordingly, current consumed by the pull-middle driver diminishes as a common mode voltage and the middle level voltage stabilizes at the receiver and transmitter, respectively. This results in lower power consumption without sacrificing performance benefits gained by driving the middle voltage during transitions. Another advantage is that when the topology described above is utilized without receiver termination, no direct current (DC) path exists, and only alternating current (AC) for charging and discharging an output wire capacitance is consumed. This allows for very low power operation for low data rate applications without receiver termination.

Figure 17:
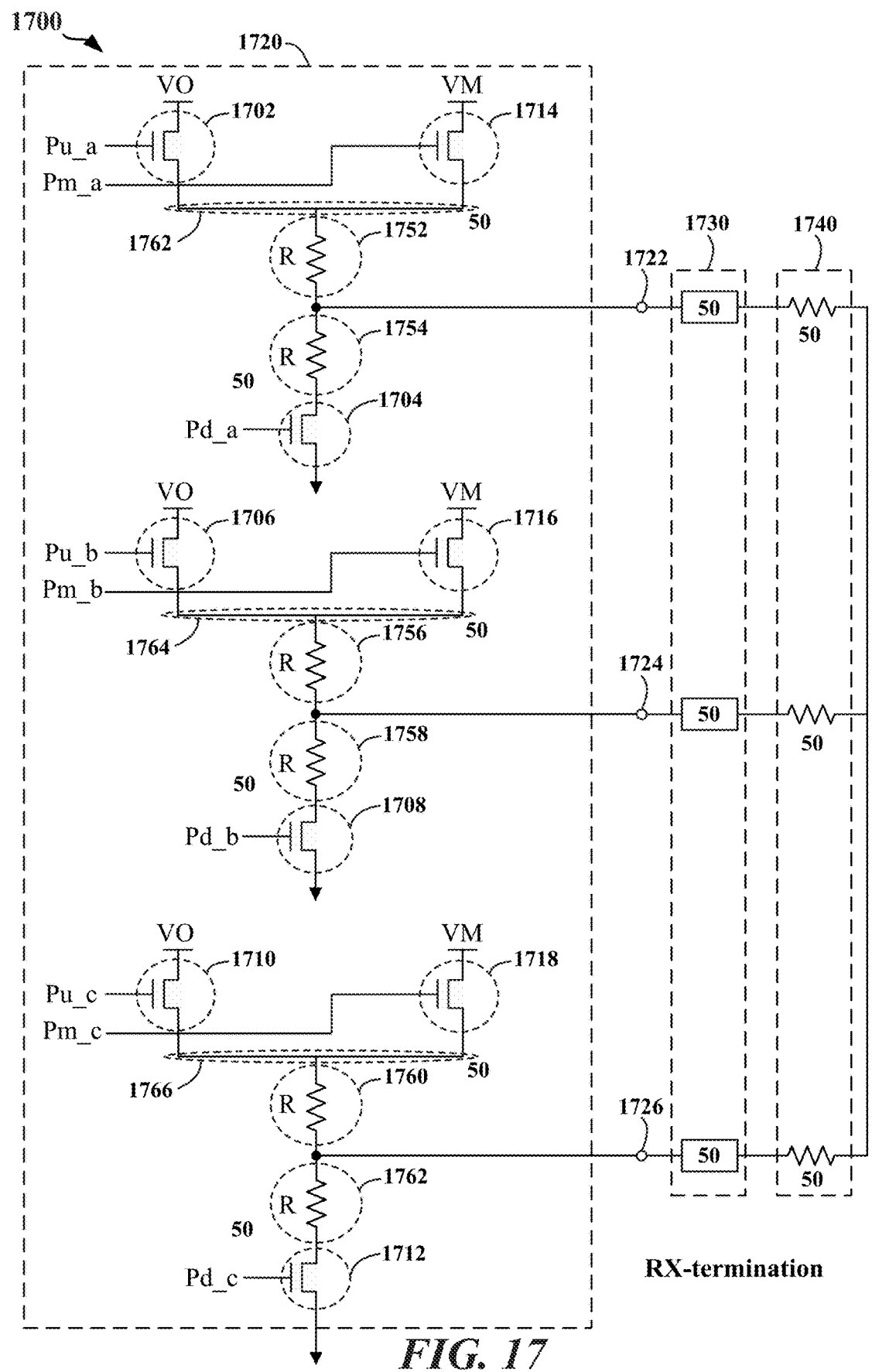
FIG. 17 illustrates a fifth example of lines interfaces used to drive three signal wires in a 3-phase system.

FIG. 17 illustrates a fifth example 1700 of lines interfaces used to drive three signal wires in a 3-phase system. In the fifth example 1700, a voltage mode driver (transmitter) 1720 may utilize receiver (RX)-termination, wherein impedances may be provided at a receiver 1740 to cause transmission lines 1730 or output terminals 1722, 1724, and 1726 to more rapidly acquire a middle level voltage and to maintain the transmission lines 1730 or the output terminals 1722, 1724, and 1726 at the middle level voltage. As shown in FIG. 17, the transmission lines 1730 may have characteristic impedances of 50 Ohms, and the receiver 1740 may terminate the transmission lines 1730 using 50-Ohm impedances. However, termination at the receiver 1740 is not limited to the use of 50-Ohm impedances as various other impedance values may be used in accordance with the present disclosure. According to other aspects, the voltage mode driver (transmitter) 1720 may not utilize RX-termination (referred to as "RX-untermination"). In an RX-untermination architecture, impedances are not provided at a receiver side to cause the transmission lines 1730 (or the output terminals 1722, 1724, and 1726) to more rapidly acquire a middle level voltage and/or maintain the transmission lines 1730 (or the output terminals 1722, 1724, and 1726) at the middle level voltage.

In an aspect, the voltage mode driver 1720 includes line drivers having a pull-up segment (or driver) and a pull-down segment (or driver) to drive an associated output terminal toward a high level voltage and a low level voltage. The line drivers of the voltage mode driver 1720 further include an additional segment (or driver) dedicated to driving the associated output terminal toward a middle level voltage. The middle level voltage driven by the additional segment may be derived from a voltage supply rail different from a voltage supply rail used by the pull-up segment for driving the associated output terminal toward the high level voltage.

A line driver of the voltage mode driver 1720 may include a first pull-up transistor 1702 for driving a first output terminal 1722 toward a high level voltage based on a received first pull-up signal (Pu_a), a first pull-down transistor 1704 for driving the first output terminal 1722 toward a low level voltage based on a received first pull-down signal (Pd_a), and a first pull-middle transistor 1714 for driving the first output terminal 1722 toward a middle level voltage based on a received first pull-middle signal (Pm_a). When the first output terminal 1722 is to be driven toward the high level voltage (e.g., +1 signaling state), the first pull-up transistor 1702 is turned on, the first pull-down transistor 1704 is turned off, and the first pull-middle transistor 1714 is turned off, thus causing the first output terminal 1722 to be actively driven toward the high level voltage. When the first output terminal 1722 is to be driven toward the low level voltage (e.g., −1 signaling state), the first pull-down transistor 1704 is turned on, the first pull-up transistor 1702 is turned off, and the first pull-middle transistor 1714 is turned off, thus causing the first output terminal 1722 to be actively driven toward the low level voltage. When the first output terminal 1722 is to be driven toward the middle level voltage (e.g., 0 signaling state), both the first pull-up transistor 1702 and the first pull-down transistor 1704 are turned off, and the first pull-middle transistor 1714 is turned on using the first pull-middle signal (Pm_a).

A second line driver of the voltage mode driver 1720 may include a second pull-up transistor 1706 for driving a second output terminal 1724 toward a high level voltage based on a received second pull-up signal (Pu_b), a second pull-down transistor 1708 for driving the second output terminal 1724 toward a low level voltage based on a received second pull-down signal (Pd_b), and a second pull-middle transistor 1716 for driving the second output terminal 1724 toward a middle level voltage based on a received second pull-middle signal (Pm_b). A third line driver of the voltage mode driver 1720 may include a third pull-up transistor 1710 for driving a third output terminal 1726 toward a high level voltage based on a received third pull-up signal (Pu_c), a third pull-down transistor 1712 for driving the third output terminal 1726 toward a low level voltage based on a received third pull-down signal (Pd_c), and a third pull-middle transistor 1718 for driving the third output terminal 1726 toward a middle level voltage based on a received third pull-middle signal (Pm_c). Notably, the operation for driving the second output terminal 1724 and the third output terminal 1726 toward the high/low/middle level voltage using a corresponding pull-up transistor, pull-down transistor, and/or pull-middle transistor is similar to the described operation for driving the first output terminal 1722.

As stated above, the line drivers of the voltage mode driver 1720 may further include additional segments (or drivers) dedicated to driving respective output terminals toward the middle level voltage. As described, the first pull-middle transistor 1714 drives the first output terminal 1722 toward the middle level voltage, the second pull-middle transistor 1716 drives the second output terminal 1724 toward the middle level voltage, and the third pull-middle transistor 1718 drives the third output terminal 1726 toward the middle level voltage.

As an example, an operation for driving an output terminal toward the middle level voltage will be described with respect to the first pull-middle transistor 1714 configured to drive the first output terminal 1722 toward the middle level voltage. Notably, the operation for driving the second output terminal 1724 using the second pull-middle transistor 1716 and the operation for driving the third output terminal 1726 using the third pull-middle transistor 1718 is similar to the described operation for driving the first output terminal 1722 using the first pull-middle transistor 1714.

The first pull-middle transistor 1714 is configured to receive a first pull-middle signal (Pm_a). When the first output terminal 1722 is to be driven toward the middle level voltage (e.g., 0 signaling state) based on the Pm_a, the first pull-middle transistor 1714, sourced by a supply voltage VM, drives the first output terminal 1722 toward a voltage level within a voltage range bounded by the high voltage level and the low voltage level. In an aspect, the first pull-middle transistor 1714 is turned off when the first pull-up transistor 1702 drives the first output terminal 1722 toward the high voltage level or when the first pull-down transistor 1704 drives the first output terminal 1722 toward the low voltage level. In an aspect, the supply voltage VM used to source the first pull-middle transistor 1714 is supplied/derived from a different voltage supply rail that supplies a voltage VO used to source the first pull-up transistor 1702. Hence, a voltage regulator that regulates the voltage VM supplied to the first pull-middle transistor 1714 may be different from a voltage regulator that regulates the voltage VO supplied to the first pull-up transistor 1702. Notably, the operation for driving the second output terminal 1724 using the second pull-middle transistor 1716 and the operation for driving the third output terminal 1726 using the third pull-middle transistor 1718 is similar to the described operation for driving the first output terminal 1722 using the first pull-middle transistor 1714.

In an aspect of the disclosure, the line drivers of the voltage mode driver 1720 may include a number of resistors that are arranged in a particular manner with driver components in order to decrease device area and/or increase device performance For example, a first end of a first resistor 1752 is coupled to a source of the first pull-up transistor 1702 and a source of the first pull-middle transistor 1714. A second end of the first resistor 1752 is coupled to the first output terminal 1722 and a first end of a second resistor 1754. Moreover, the first end of the second resistor 1754 is coupled to the first output terminal 1722 and a second end of the second resistor 1754 is coupled to a drain of the first pull-down transistor 1704. Similarly, a first end of a third resistor 1756 is coupled to a source of the second pull-up transistor 1706 and a source of the second pull-middle transistor 1716. A second end of the third resistor 1756 is coupled to the second output terminal 1724 and a first end of a fourth resistor 1758. Moreover, the first end of the fourth resistor 1758 is coupled to the second output terminal 1724 and a second end of the fourth resistor 1758 is coupled to a drain of the second pull-down transistor 1708. Also, a first end of a fifth resistor 1760 is coupled to a source of the third pull-up transistor 1710 and a source of the third pull-middle transistor 1718. A second end of the fifth resistor 1760 is coupled to the third output terminal 1726 and a first end of a sixth resistor 1762. Moreover, the first end of the sixth resistor 1762 is coupled to the third output terminal 1726 and a second end of the sixth resistor 1762 is coupled to a drain of the third pull-down transistor 1712.

As shown in FIG. 17, one resistor (e.g., resistor 1752/1756/1760) is coupled to the sources of two transistors (pull-up transistor 1702/1706/1710 and pull-middle transistor 1714/1716/1718). By using one resistor at the sources of the two transistors instead of using a separate resistor for each transistor, device area is decreased. As an example, a value of the resistor 1752/1756/1760 (and the resistor 1754/1758/1762) may be R=40 Ohms, or some other predetermined value. In addition to decreasing device area, using one resistor at the sources of the two transistors may provide performance benefits. For example, when device components are arranged in the manner described with respect to FIG. 17, a middle node 1762/1764/1766 shared by the first end of the resistor 1752/1756/1760, the source of the pull-up transistor 1702/1706/1710, and the source of the pull-middle transistor 1714/1716/1718 may be pre-charged, thus altering the behavior of the voltage mode driver 1720. The pre-charged middle node 1762/1764/1766 may essentially be shared between the pull-up transistor 1702/1706/1710, the pull-middle transistor 1714/1716/1718, and the pull-down transistor 1704/1708/1712. Moreover, the middle node 1762/1764/1766 may move depending on which state was previously transmitted. Accordingly, different amounts of sharing may occur along the path between the pull-up transistor 1702/1706/1710 and the pull-middle transistor 1714/1716/1718.

Figure 18:
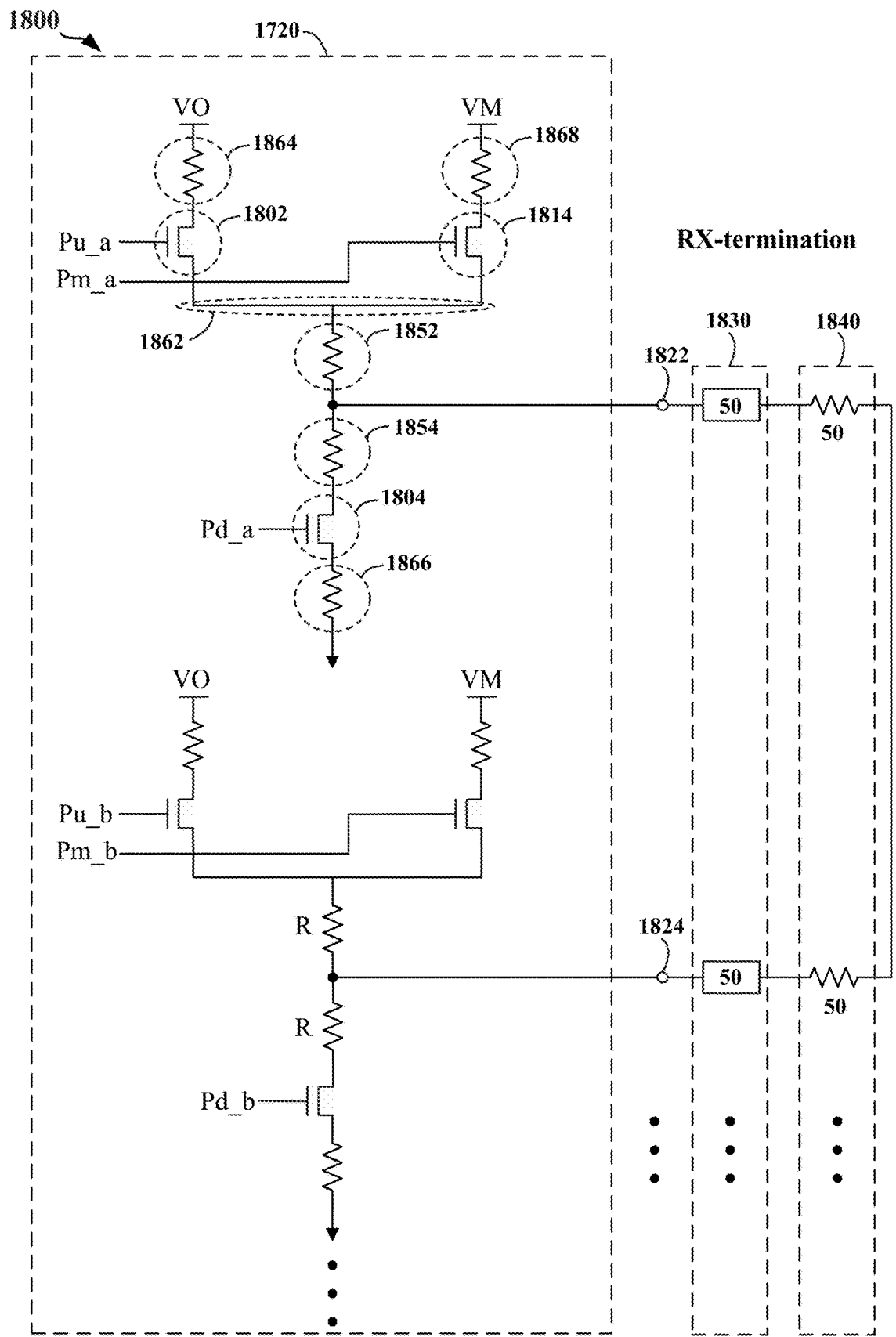
FIG. 18 illustrates a sixth example of lines interfaces used to drive three signal wires in a 3-phase system.

FIG. 18 illustrates a sixth example 1800 of lines interfaces used to drive three signal wires in a 3-phase system. Although the sixth example 1800 is shown to have a voltage mode driver using receiver (RX)-termination, wherein impedances may be provided at a receiver 1840 to cause transmission lines 1830 to more rapidly acquire and maintain a middle level voltage, it is contemplated that RX-untermination may also be utilized. The sixth example 1800 includes a voltage mode driver 1820 that operates in a manner similar to the operation described above with respect to the voltage mode driver 1720 of FIG. 17. That is, similar to the voltage mode driver 1720, the voltage mode driver 1820 includes line drivers having a pull-up segment (or driver) (e.g., first pull-up transistor 1802) and a pull-down segment (or driver) (e.g., first pull-down transistor 1804) to drive an associated output terminal (e.g., first output terminal 1822) toward a high level voltage and a low level voltage. The line drivers of the voltage mode driver 1820 further include an additional transistor (or driver) (e.g., first pull-middle transistor 1814) dedicated to driving the associated output terminal toward a middle level voltage. The middle level voltage driven by the additional segment may be derived from a voltage supply rail (VM) different from a voltage supply rail (VO) used by the pull-up segment for driving the associated output terminal toward the high level voltage.

In the sixth example 1800, the line interfaces (line drivers) that drive the three signal wires (i.e., a first output terminal 1822, a second output terminal 1824, and a third output terminal (not shown)) operate in a similar way. Therefore, the architecture of the line interfaces will be described with respect to the line interface (line driver) that drives the first output terminal 1822. However, the description may also apply to the architecture of the line interfaces that drive the second output terminal 1824 and the third output terminal (not shown).

In an aspect of the disclosure, the line drivers of the voltage mode driver 1820 may include a number of resistors that are arranged in a particular manner with driver components in order to decrease device area and/or increase device performance For example, a first end of a first resistor 1852 is coupled to a source of the first pull-up transistor 1802 and a source of the first pull-middle transistor 1814. A second end of the first resistor 1852 is coupled to the first output terminal 1822 and a first end of a second resistor 1854. Moreover, the first end of the second resistor 1854 is coupled to the first output terminal 1822 and a second end of the second resistor 1854 is coupled to a drain of the first pull-down transistor 1804.

In a further aspect, in order to achieve more overdrive on the first pull-up transistor 1802 and the first pull-middle transistor 1814, a resistance between the first pull-up transistor 1802 and the first output terminal 1822, as well as a resistance between the first pull-middle transistor 1814 and the first output terminal 1822, may be minimized For example, a first end of a third resistor 1864 may be coupled to the supply rail that supplies the voltage VO and a second end of the third resistor 1864 may be coupled to a drain of the first pull-up transistor 1802. Also, a first end of a fourth resistor 1866 may be coupled to a source of the first pull-down transistor 1804 and a second end of the fourth resistor 1866 may be coupled to a ground node. Moreover, a first end of a fifth resistor 1868 may be coupled to the supply rail that supplies the voltage VM and a second end of the fifth resistor 1868 may be coupled to a drain of the first pull-middle transistor 1814. Notably, the arrangement of the resistors and transistors described above for the line interface that drives the first output terminal 1822 may also apply to the resistors and transistors of the line interfaces that drive the second output terminal 1824 and the third output terminal (not shown).

In an aspect, a value of the resistance of the first resistor 1852 and the second resistor 1854 may have a lowest possible value in order maintain a voltage at a middle node 1862 as low as possible. Moreover, by providing resistance between the drain of the first pull-up transistor 1802 and the supply voltage VO (e.g., third resistor 1864), and between the drain of the first pull-middle transistor 1814 and the supply voltage VM (e.g., fifth resistor 1868), a gate-to-source voltage of the respective transistors is maximized. Such an arrangement facilitates as large an overdrive as possible for the first pull-up transistor 1802 and the first pull-middle transistor 1814. Accordingly, a size of the transistors of the voltage mode driver 1820 may be decreased while achieving the same performance as the voltage mode driver 1720 of FIG. 17, and therefore, an area of the voltage mode driver 1820 may be reduced.

Figure 19:
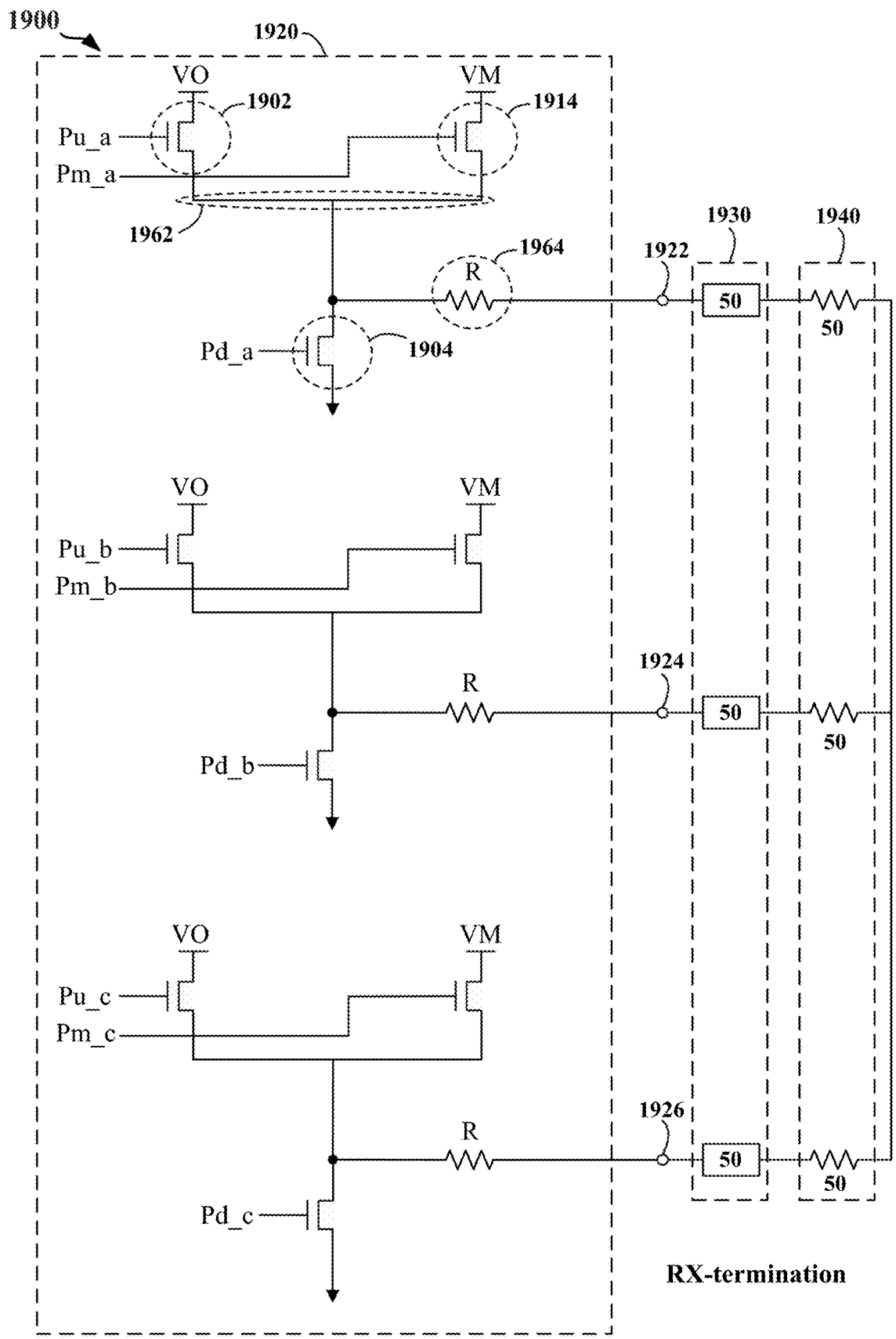
FIG. 19 illustrates a seventh example of lines interfaces used to drive three signal wires in a 3-phase system.

FIG. 19 illustrates a seventh example 1900 of lines interfaces used to drive three signal wires in a 3-phase system. Although the seventh example 1900 is shown to have a voltage mode driver using receiver (RX)-termination, wherein impedances may be provided at a receiver 1940 to cause transmission lines 1930 to more rapidly acquire and maintain a middle level voltage, it is contemplated that RX-untermination may also be utilized. The seventh example 1900 includes a voltage mode driver 1920 that operates in a manner similar to the operation described above with respect to the voltage mode driver 1720 of FIG. 17. That is, similar to the voltage mode driver 1720, the voltage mode driver 1920 includes line drivers having a pull-up segment (or driver) (e.g., first pull-up transistor 1902) and a pull-down segment (or driver) (e.g., first pull-down transistor 1904) to drive an associated output terminal (e.g., first output terminal 1922) toward a high level voltage and a low level voltage. The line drivers of the voltage mode driver 1920 further include an additional transistor (or driver) (e.g., first pull-middle transistor 1914) dedicated to driving the associated output terminal toward a middle level voltage. The middle level voltage driven by the additional segment may be derived from a voltage supply rail (VM) different from a voltage supply rail (VO) used by the pull-up segment for driving the associated output terminal toward the high level voltage.

In the seventh example 1900, the line interfaces (line drivers) that drive the three signal wires (i.e., a first output terminal 1922, a second output terminal 1924, and a third output terminal 1926) operate in a similar way. Therefore, the architecture of the line interfaces will be described with respect to the line interface (line driver) that drives the first output terminal 1922. However, the description may also apply to the architecture of the line interfaces that drive the second output terminal 1924 and the third output terminal 1926.

In an aspect of the disclosure, the line drivers of the voltage mode driver 1920 may include a number of resistors that are arranged in a particular manner with driver components in order to decrease device area and/or increase device performance. For example, a source of the first pull-up transistor 1902, a source of the first pull-middle transistor 1914, and a drain of the first pull-down transistor 1904 are coupled to a middle node 1962. Moreover a first end of a resistor 1964 is coupled to the middle node 1962 and a second end of the resistor 1964 is coupled to the first output terminal 1922. As an example, a value of the resistor 1964 may be R=40 Ohms, 50 Ohms, or some other predetermined value.

As seen in FIG. 19, one resistor (e.g., resistor 1964) is shared between the first pull-up transistor 1902, the first pull-down transistor 1904, and the first pull-middle transistor 1914. Accordingly, because one common resistor is utilized between all of the transistors of the line interface that drives the first output terminal 1922, an overall area of the voltage mode driver 1920 may be reduced. Notably, the arrangement of the resistor and transistors described above for the line interface that drives the first output terminal 1922 may also apply to the resistor and transistors of the line interfaces that drive the second output terminal 1924 and the third output terminal 1926.

Figure 20:
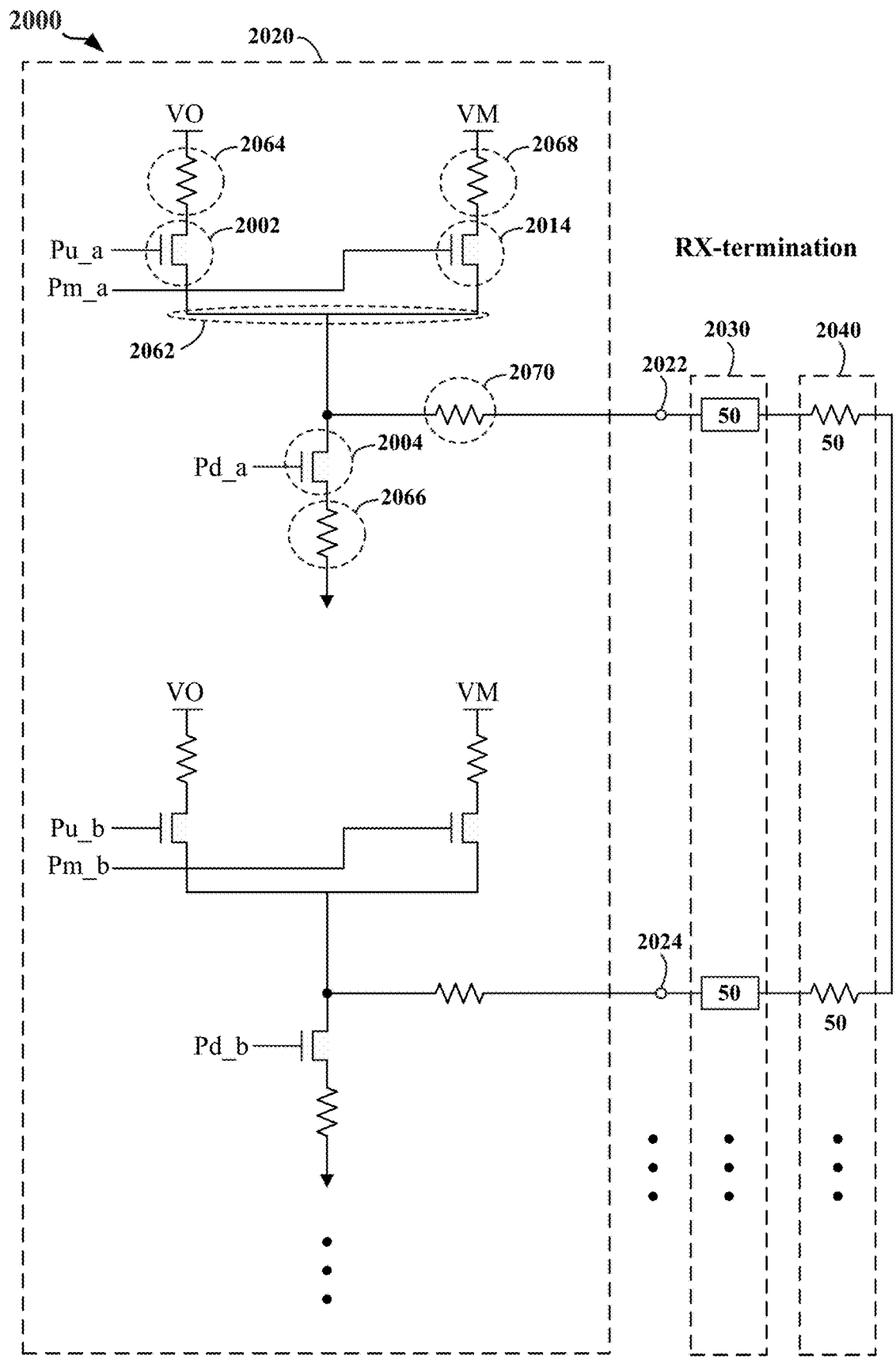
FIG. 20 illustrates an eighth example of lines interfaces used to drive three signal wires in a 3-phase system.

FIG. 20 illustrates an eighth example 2000 of lines interfaces used to drive three signal wires in a 3-phase system. Although the eighth example 2000 is shown to have a voltage mode driver using receiver (RX)-termination, wherein impedances may be provided at a receiver 2040 to cause transmission lines 2030 to more rapidly acquire and maintain a middle level voltage, it is contemplated that RX-untermination may also be utilized. The eighth example 2000 includes a voltage mode driver 2020 that operates in a manner similar to the operation described above with respect to the voltage mode driver 1720 of FIG. 17. That is, similar to the voltage mode driver 1720, the voltage mode driver 2020 includes line drivers having a pull-up segment (or driver) (e.g., first pull-up transistor 2002) and a pull-down segment (or driver) (e.g., first pull-down transistor 2004) to drive an associated output terminal (e.g., first output terminal 2022) toward a high level voltage and a low level voltage. The line drivers of the voltage mode driver 2020 further include an additional transistor (or driver) (e.g., first pull-middle transistor 2014) dedicated to driving the associated output terminal toward a middle level voltage. The middle level voltage driven by the additional segment may be derived from a voltage supply rail (VM) different from a voltage supply rail (VO) used by the pull-up segment for driving the associated output terminal toward the high level voltage.

In the eighth example 2000, the line interfaces (line drivers) that drive the three signal wires (i.e., a first output terminal 2022, a second output terminal 2024, and a third output terminal (not shown)) operate in a similar way. Therefore, the architecture of the line interfaces will be described with respect to the line interface (line driver) that drives the first output terminal 2022. However, the description may also apply to the architecture of the line interfaces that drive the second output terminal 2024 and the third output terminal (not shown).

In an aspect of the disclosure, the line drivers of the voltage mode driver 2020 may include a number of resistors that are arranged in a particular manner with driver components in order to decrease device area and/or increase device performance. For example, a source of the first pull-up transistor 2002, a source of the first pull-middle transistor 2014, and a drain of the first pull-down transistor 2004 are coupled to a middle node 2062. Moreover a first end of a common resistor 2070 is coupled to the middle node 2062 and a second end of the common resistor 2070 is coupled to the first output terminal 2022. As such, the common resistor 2070 is shared between the first pull-up transistor 2002, the first pull-down transistor 2004, and the first pull-middle transistor 1914. Accordingly, because the common resistor 2070 is utilized between all of the transistors of the line interface that drives the first output terminal 2022, an overall area of the voltage mode driver 2020 may be reduced.

Additionally, in order to achieve more overdrive on the first pull-up transistor 2002 and the first pull-middle transistor 2014, a resistance between the first pull-up transistor 2002 and the first output terminal 2022, as well as a resistance between the first pull-middle transistor 2014 and the first output terminal 2022, may be minimized. For example, a first end of a resistor 2064 may be coupled to the supply rail that supplies the voltage VO and a second end of the resistor 2064 may be coupled to a drain of the first pull-up transistor 2002. Also, a first end of a resistor 2066 may be coupled to a source of the first pull-down transistor 2004 and a second end of the resistor 2066 may be coupled to a ground node. Moreover, a first end of a resistor 2068 may be coupled to the supply rail that supplies the voltage VM and a second end of the resistor 2068 may be coupled to a drain of the first pull-middle transistor 2014. Notably, the arrangement of the resistors and transistors described above for the line interface that drives the first output terminal 2022 may also apply to the resistors and transistors of the line interfaces that drive the second output terminal 2024 and the third output terminal (not shown).

In an aspect, a value of the resistance of the common resistor 2070 may have a lowest possible value in order maintain a voltage at the middle node 2062 as low as possible. Moreover, by providing resistance between the drain of the first pull-up transistor 2002 and the supply voltage VO (e.g., resistor 2064), and between the drain of the first pull-middle transistor 2014 and the supply voltage VM (e.g., resistor 2068), a gate-to-source voltage of the respective transistors is maximized. Such an arrangement facilitates as large an overdrive as possible for the first pull-up transistor 2002 and the first pull-middle transistor 2014. Accordingly, a size of the transistors of the voltage mode driver 2020 may be decreased while achieving the same performance as the voltage mode driver 1720 of FIG. 17, and therefore, an area of the voltage mode driver 2020 may be reduced.

Figure 21:
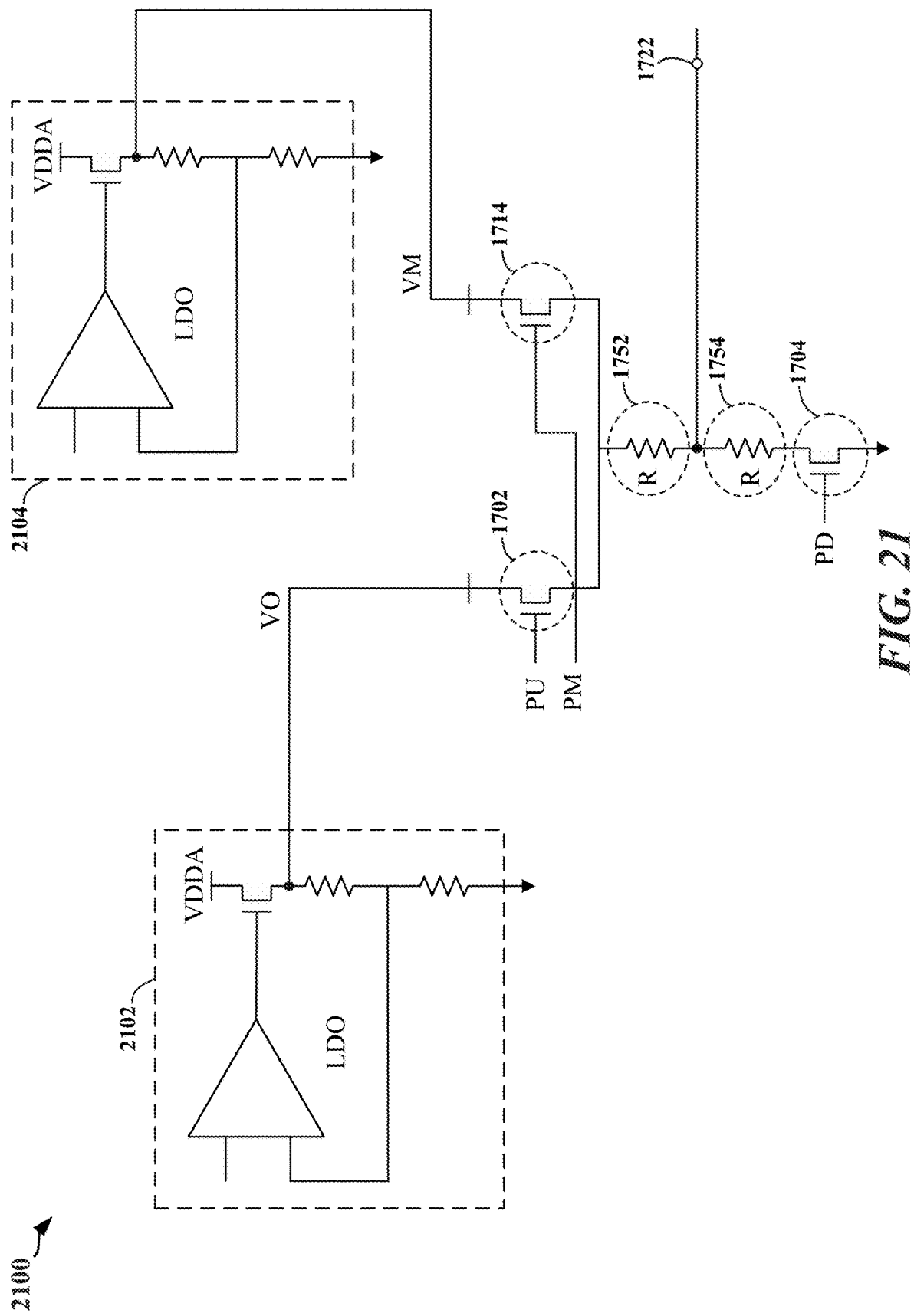
FIG. 21 illustrates an example of LDO regulators in operation with a pull-up transistor and a pull-middle transistor.

FIG. 21 illustrates an example 2100 of LDO regulators in operation with a pull-up transistor and a pull-middle transistor. Although the LDO regulators of FIG. 21 are shown to operate with a line interface having an arrangement of transistors and resistors for driving the first output terminal 1722 (see FIG. 17), the LDO regulators may also operate with any line interface having an arrangement of transistors and resistors for driving a corresponding output terminal, as described above with respect to FIGS. 17-20.

In the example 2100, a first LDO regulator 2102 regulates a voltage VO supplied to the first pull-up transistor 1702 but does not regulate a voltage VM supplied to the first pull-middle transistor 1714. According to the example 2100, a second LDO regulator 2104 regulates a voltage VM supplied to the first pull-middle transistor 1714. In view of the disclosure above, a voltage used by a pull-middle segment (transistor/driver) for driving an output terminal toward a middle level voltage is derived from a voltage supply rail that is different from a voltage supply rail supplying a voltage used by a pull-up segment (transistor/driver) for driving an output terminal toward a high level voltage.

Figure 22:
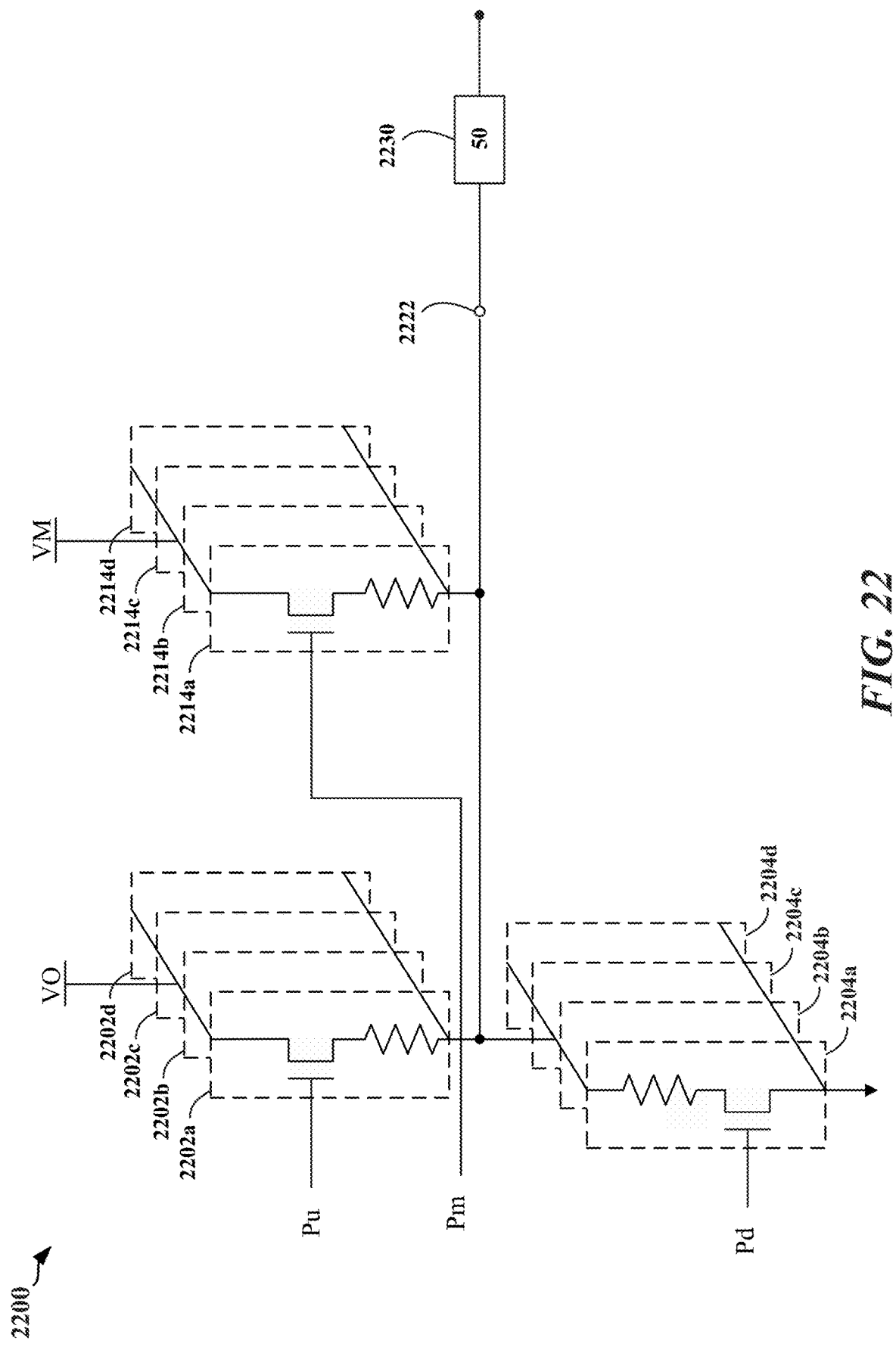
FIG. 22 illustrates an example of a line interface using multiple line drivers in parallel for driving a signal wire.

FIG. 22 illustrates an example of a line interface 2200 using multiple line drivers in parallel for driving a signal wire. In aspect, the line interface 2200 using multiple line drivers in parallel, or variants thereof, may be implemented in any of the line interfaces described above for driving three signal wires in a 3-phase system, such as the line interfaces described with respect to FIGS. 17-20.

A voltage mode driver (transmitter) implementing the line interface 2200 may utilize receiver (RX)-termination, wherein impedances may be provided at a receiver to cause a transmission line 2230 or an output terminals 2222 to more rapidly acquire a middle level voltage and to maintain the transmission line 2230 or the output terminal 2222 at the middle level voltage. As shown in FIG. 22, the transmission line 2230 may have a characteristic impedance of 50 Ohms. The receiver may terminate the transmission line 2230 using a 50-Ohm impedance, for example, or any other impedance value in accordance with the present disclosure. In an aspect, the voltage mode driver (transmitter) implementing the line interface 2200 may not utilize RX-termination (referred to as "RX-untermination"). Accordingly, an impedance is not provided at the receiver to cause the transmission line 2230 (or the output terminal 2222) to more rapidly acquire a middle level voltage and/or maintain the transmission line 2230 (or the output terminal 2222) at the middle level voltage.

In an aspect, the line interface 2200 uses a pull-up segment (or driver) and a pull-down segment (or driver) to drive an associated output terminal toward a high level voltage and a low level voltage. The line interface 2200 further uses an additional segment (or driver) dedicated to driving the associated output terminal toward a middle level voltage. The middle level voltage driven by the additional segment (pull-middle segment) may be derived from a same voltage supply rail used by the pull-up segment for driving the associated output terminal toward the high level voltage.

The pull-up segment may include a number of pull-up line drivers coupled in a parallel manner. Each pull-up line driver may include one or more transistors, or one or more transistors coupled to one or more resistors (transistor-resistor pair), configured to drive the output terminal 2222 toward a high level voltage based on a received pull-up signal (Pu). In an example, the pull-up segment may include a first pull-up line driver 2202a, a second pull-up line driver 2202b, a third pull-up line driver 2202c, and a fourth pull-up line driver 2202d. The pull-up segment is enabled with the same pull-up signal (Pu) copied as many times as the number of pull-up line drivers. Hence, each of the four pull-up line drivers 2202a, 2202b, 2202c, and 2202d are enabled by four copies of the pull-up signal (Pu). Notably, although only four pull-up line drivers are shown for the pull-up segment in FIG. 22, aspects of the present disclosure provide that any number of pull-up line drivers $N_{Pu}$ may be coupled in parallel to each other, where $N_{Pu}$ is an integer greater than 1.

The pull-down segment may include a number of pull-down line drivers coupled in a parallel manner Each pull-down line driver may include one or more transistors, or one or more transistors coupled to one or more resistors (transistor-resistor pair), configured to drive the output terminal 2222 toward a low level voltage based on a received pull-down signal (Pd). In an example, the pull-down segment may include a first pull-down line driver 2204a, a second pull-down line driver 2204b, a third pull-down line driver 2204c, and a fourth pull-down line driver 2204d. The pull-down segment is enabled with the same pull-down signal (Pd) copied as many times as the number of pull-down line drivers. Hence, each of the four pull-down line drivers 2204a, 2204b, 2204c, and 2204d are enabled by four copies of the pull-down signal (Pd). Notably, although only four pull-down line drivers are shown for the pull-down segment in FIG. 22, aspects of the present disclosure provide that any number of pull-down line drivers $N_{Pd}$ may be coupled in parallel to each other, where $N_{Pd}$ is an integer greater than 1.

When the output terminal 2222 is to be driven toward the high level voltage (e.g., +1 signaling state), the pull-up segment is turned on and the pull-down segment is turned off, thus causing the output terminal 2222 to be actively driven toward the high level voltage. When the output terminal 2222 is to be driven toward the low level voltage (e.g., −1 signaling state), the pull-down segment is turned on and the pull-up segment is turned off, thus causing the output terminal 2222 to be actively driven toward the low level voltage. When the output terminal 2222 is to be driven toward the middle level voltage (e.g., 0 signaling state), both the pull-up segment and the pull-down segment are turned off.

The pull-up segment may include a number of pull-middle line drivers coupled in a parallel manner. Each pull-middle line driver may include one or more transistors, or one or more transistors coupled to one or more resistors (transistor-resistor pair), configured to drive the output terminal 2222 toward a middle level voltage based on a received pull-middle signal (Pm). In an example, the pull-middle segment may include a first pull-middle line driver 2214a, a second pull-middle line driver 2214b, a third pull-middle line driver 2214c, and a fourth pull-middle line driver 2214d. The pull-middle segment is enabled with the same pull-middle signal (Pm) copied as many times as the number of pull-middle line drivers. Hence, each of the four pull-middle line drivers 2214a, 2214b, 2214c, and 2214d are enabled by four copies of the pull-middle signal (Pm). Notably, although only four pull-middle line drivers are shown for the pull-middle segment in FIG. 22, aspects of the present disclosure provide that any number of pull-middle line drivers $N_{Pm}$ may be coupled in parallel to each other, where $N_{Pm}$ is an integer greater than 1.

When the output terminal 2222 is to be driven toward the middle level voltage (e.g., 0 signaling state) based on the Pm, the pull-middle segment, sourced by a supply voltage VM, drives the output terminal 2222 toward a voltage level within a voltage range bounded by the high voltage level and the low voltage level. In an aspect, the pull-middle segment is turned off when the pull-up segment drives the output terminal 2222 toward the high voltage level or when the pull-down segment drives the output terminal 2222 toward the low voltage level.

In an aspect, a total equivalent impedance of a pull-up segment that includes the multiple pull-up line drivers in parallel may be equal to 50 Ohms. In one example implementation, each of the four pull-up line drivers 2202a, 2202b, 2202c, and 2202d may be designed to have an impedance of 200 Ohms. Hence, when all four pull-up line drivers are enabled, a total impedance of the pull-up segment will be 200 Ohms/4=50 Ohms.

In another aspect, a total equivalent impedance of a pull-down segment that includes the multiple pull-down line drivers in parallel may be equal to 50 Ohms. In one example implementation, each of the four pull-down line drivers 2204a, 2204b, 2204c, and 2204d may be designed to have an impedance of 200 Ohms. Hence, when all four pull-down line drivers are enabled, a total impedance of the pull-down segment will be 200 Ohms/4=50 Ohms.

In a further aspect, a total equivalent impedance of a pull-middle segment that includes the multiple pull-middle line drivers in parallel may be equal to 50 Ohms. In one example implementation, each of the four pull-middle line drivers 2202a, 2202b, 2202c, and 2202d may be designed to have an impedance of 200 Ohms. Hence, when all four pull-up line drivers are enabled, a total impedance of the pull-middle segment will be 200 Ohms/4=50 Ohms.

Figure 23:
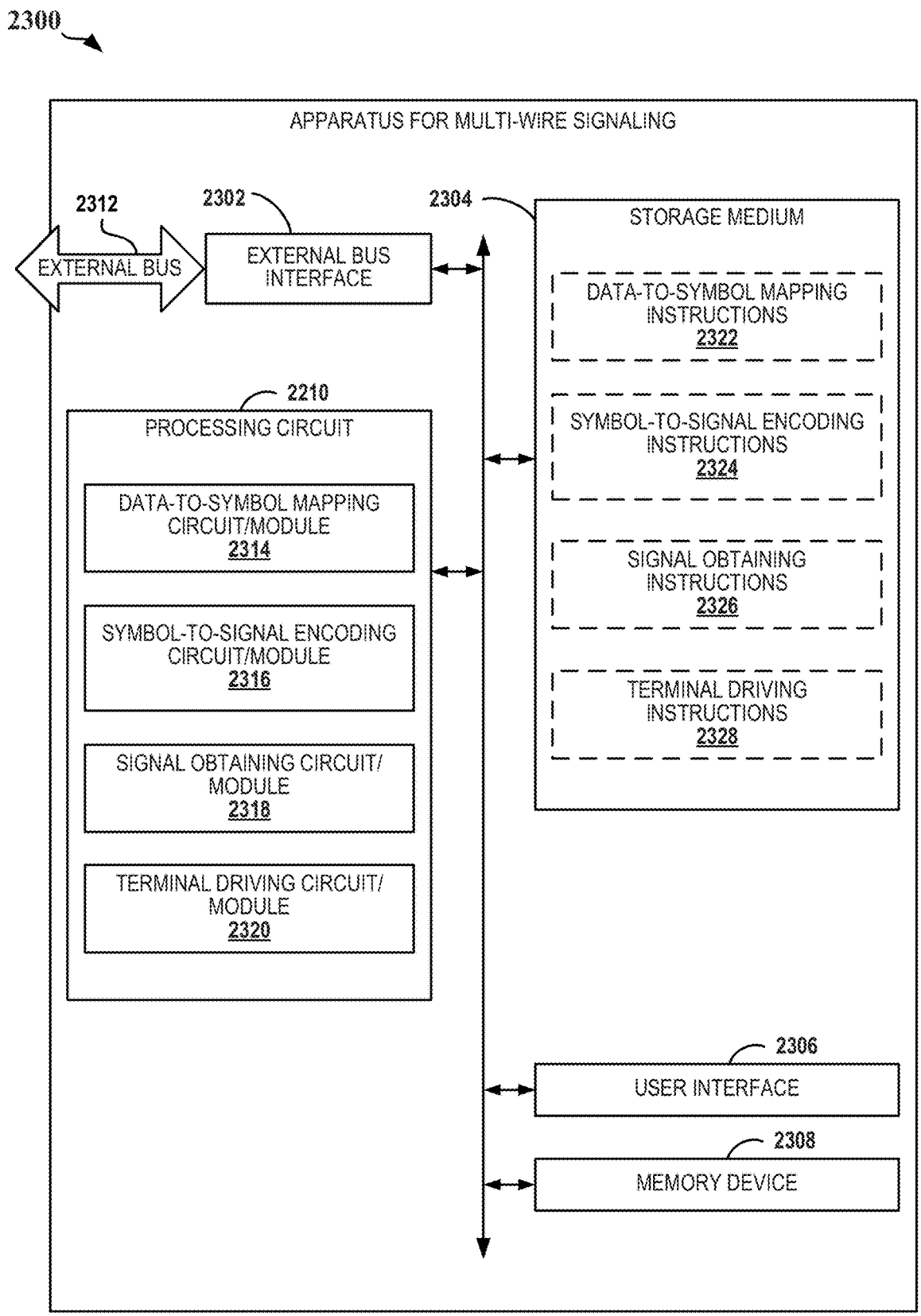
FIG. 23 is a diagram illustrating an example of a hardware implementation for a transmitter of an N-phase polarity encoded signal.

Exemplary Device and Methods for Driving a Signal Wire in a Three-Phase Communication Link FIG. 23 is a block diagram illustrating select components of an apparatus 2300 according to at least one example of the disclosure. The apparatus 2300 includes an external bus interface (or communication interface circuit) 2302, a storage medium 2304, a user interface 2306, a memory device 2308, and a processing circuit 2310. The processing circuit is coupled to or placed in electrical communication with each of the external bus interface 2302, the storage medium 2304, the user interface 2306, and the memory device 2308.

The external bus interface 2302 provides an interface for the components of the apparatus 2300 to an external bus 2312. The external bus interface 2302 may include, for example, one or more of: signal driver circuits, signal receiver circuits, amplifiers, signal filters, signal buffers, or other circuitry used to interface with a signaling bus or other types of signaling media.

The processing circuit 2310 is arranged to obtain, process and/or send data, control data access and storage, issue commands, and control other desired operations. The processing circuit 2310 may include circuitry adapted to implement desired programming provided by appropriate media in at least one example. In some instances, the processing circuit 2310 may include circuitry adapted to perform a desired function, with or without implementing programming By way of example, the processing circuit 2310 may be implemented as one or more processors, one or more controllers, and/or other structure configured to execute executable programming and/or perform a desired function. Examples of the processing circuit 2310 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2310 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2310 are for illustration and other suitable configurations within the scope of the disclosure are also contemplated.

The processing circuit 2310 is adapted for processing, including the execution of programming, which may be stored on the storage medium 2304. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 2310 may include one or more of: a data-to-symbol mapping circuit/module 2314, a symbol-to-signal encoding circuit/module 2316, a signal obtaining circuit/module 2318, or a terminal driving circuit/module 2320.

The data-to-symbol mapping circuit/module 2314 may include circuitry and/or instructions (e.g., data-to-symbol mapping instructions 2322 stored on the storage medium 2304) adapted to map data to a sequence of symbols to be transmitted on a plurality of wires via a plurality of terminals. For example, in some implementations, the data is first retrieved from the memory device 2308 and then mapped to the sequence of symbols by the data-to-symbol mapping circuit/module 2314. The sequence of symbols are then output (e.g., stored in the memory device 2308 or passed to another component).

The symbol-to-signal encoding circuit/module 2316 may include circuitry and/or instructions (e.g., symbol-to-signal encoding instructions 2324 stored on the storage medium 2304) adapted to encode the sequence of symbols in three signals, wherein each of the three signals is in one of three phases for each symbol to be transmitted, and wherein the three signals are in different phases from one another during transmission of each symbol. For example, in some implementations, the sequence of symbols are first obtained from the memory device 2308 or the data-to-symbol mapping circuit/module 2314 and then encoded in three signals by the symbol-to-signal encoding circuit/module 2316. The signals are then output (e.g., stored in the memory device 2308 or passed to another component).

The signal obtaining circuit/module 2318 may include circuitry and/or instructions (e.g., signal obtaining instructions 2326 stored on the storage medium 2304) adapted to obtain a signal to be transmitted via a terminal of the plurality of terminals, wherein the signal is one of the three signals. For example, in some implementations, the signal is obtained from the memory device 2308 or the symbol-to-signal encoding circuit/module 2316 by the signal obtaining circuit/module 2318.

In one aspect of the disclosure, the terminal driving circuit/module 2320 may include circuitry and/or instructions (e.g., terminal driving instructions 2328 stored on the storage medium 2304) adapted to drive a first terminal by outputting a first voltage level from a first driver when the signal is in a first phase, drive the first terminal by outputting a second voltage level from the first driver when the signal is in a second phase, drive the first terminal by outputting a third voltage level from a second driver when the signal is in a third phase, wherein the third voltage level is output based on a fourth voltage level for driving a second terminal of the plurality of terminals, and based on a fifth voltage level for driving a third terminal of the plurality of terminals, driving the second terminal by outputting the fourth voltage level from a third driver, and drive the third terminal by outputting the fifth voltage level from a fourth driver. In another aspect of the disclosure, the terminal driving circuit/module 2320 may include circuitry and/or instructions (e.g., terminal driving instructions 2328 stored on the storage medium 2304) adapted to drive the terminal by turning on a first transistor when the signal is in a first phase, wherein the terminal is driven towards a first voltage level when the first transistor is turned on, drive the terminal by turning on a second transistor when the signal is in a second phase, wherein the terminal is driven towards a second voltage level when the second transistor is turned on, and drive the terminal by turning on a third transistor when the signal is in a third phase, wherein the terminal is driven towards a third voltage level when the third transistor is turned on. The third transistor may be turned on based on a voltage supplied from a voltage regulator that also regulates a voltage supplied to the first transistor. Alternatively, the third transistor may be turned on based on a voltage supplied from a first voltage regulator that is different from a second voltage regulator that regulates a voltage supplied to the first transistor.

The storage medium 2304 may represent one or more processor-readable devices for storing programming, electronic data, databases, or other digital information. The storage medium 2304 may also be used for storing data that is manipulated by the processing circuit 2310 when executing programming. The storage medium 2304 may be any available media that can be accessed by the processing circuit 2310, including portable or fixed storage devices, optical storage devices, and various other mediums capable of storing, containing and/or carrying programming. By way of example and not limitation, the storage medium 2304 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 2304 may be coupled to the processing circuit 2310 such that the processing circuit 2310 can read information from, and write information to, the storage medium 2304. That is, the storage medium 2304 can be coupled to the processing circuit 2310 so that the storage medium 2304 is at least accessible by the processing circuit 2310, including examples where the storage medium 2304 is integral to the processing circuit 2310 and/or examples where the storage medium 2304 is separate from the processing circuit 2310.

Programming/instructions stored by the storage medium 2304, when executed by the processing circuit 2310, causes the processing circuit 2310 to perform one or more of the various functions and/or process steps described herein. For example, the storage medium 2304 may include one or more of: the data-to-symbol mapping instructions 2322, the symbol-to-signal encoding instructions 2324, the signal obtaining instructions 2326, or the terminal driving instructions 2328. Thus, according to one or more aspects of the disclosure, the processing circuit 2310 is adapted to perform (in conjunction with the storage medium 2304) any or all of the processes, functions, steps and/or routines for any or all of the apparatuses described herein. As used herein, the term "adapted" in relation to the processing circuit 2310 may refer to the processing circuit 2310 being one or more of configured, employed, implemented, and/or programmed (in conjunction with the storage medium 2304) to perform a particular process, function, step and/or routine according to various features described herein.

The memory device 2308 may represent one or more memory devices and may comprise any of the memory technologies listed above or any other suitable memory technology. The memory device 2308 may store delay-related information, along with other information used by one or more of the components of the apparatus 2300. The memory device 2308 also may be used for storing data that is manipulated by the processing circuit 2310 or some other component of the apparatus 2300. In some implementations, the memory device 2308 and the storage medium 2304 are implemented as a common memory component.

The user interface 2306 includes functionality that enables a user to interact with the apparatus 2300. For example, the user interface 2306 may interface with one or more user output devices (e.g., a display device, etc.) and one or more user input devices (e.g., a keyboard, a tactile input device, etc.).

With the above in mind, examples of operations relating to multi-wire signaling according to the disclosure will be described in more detail in conjunction with the flowcharts of FIGS. 24 and 25. For convenience, the operations of FIGS. 24 and 25 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 24:
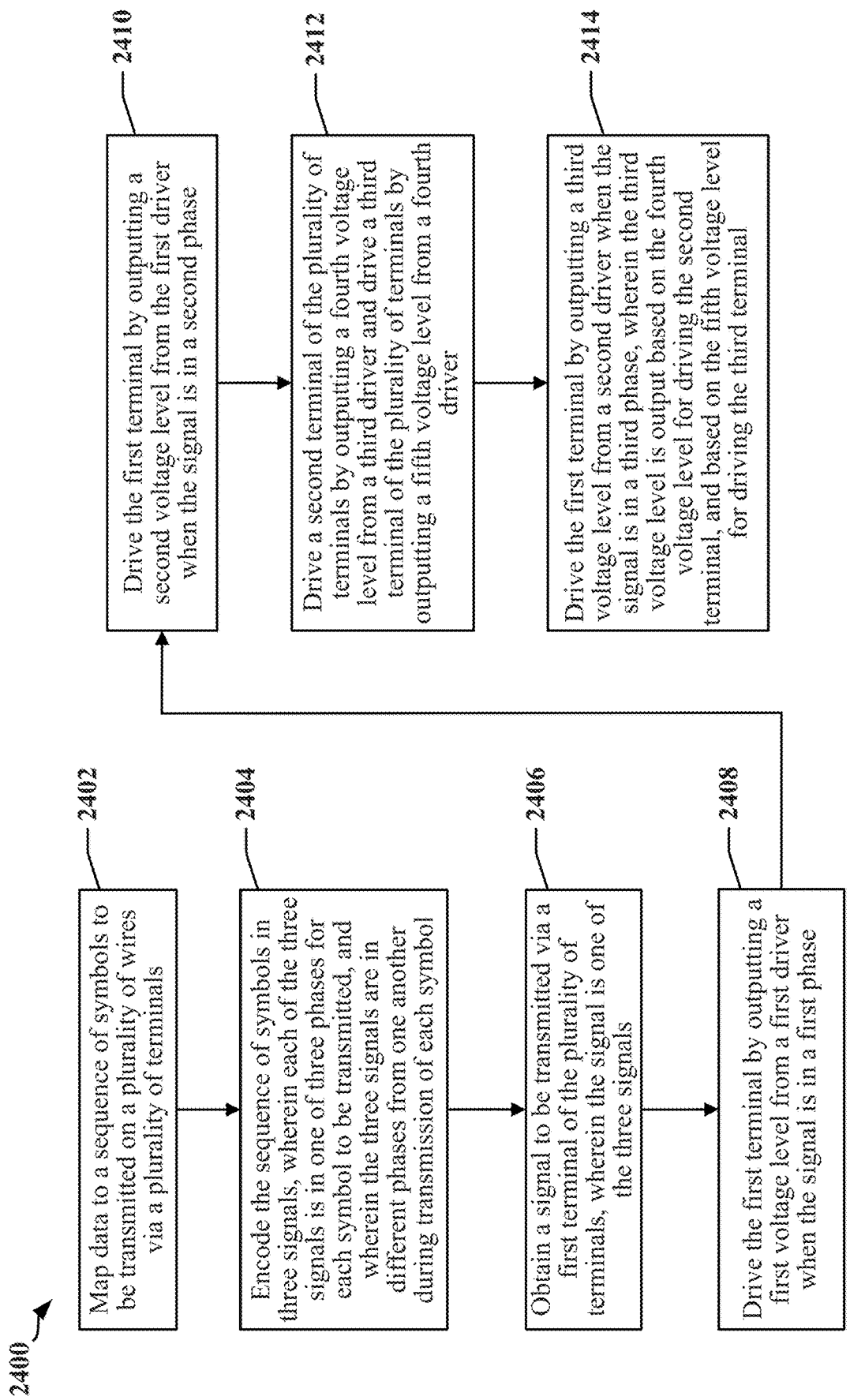
FIG. 24 is a flowchart illustrating a data transfer method.

FIG. 24 is a flowchart illustrating a data transfer method. The data transfer method may involve transmission of a plurality of symbols in multiphase signals. Each symbol may define a phase state for each signal and polarity for certain pairs of signals. The method may be performed by a transmitter (e.g., voltage mode driver 1120 or apparatus 2300).

The transmitter may map data to a sequence of symbols to be transmitted on a plurality of wires via a plurality of terminals 2402. The transmitter may further encode the sequence of symbols in three signals 2404. Each of the three signals may be in one of three phases for each symbol to be transmitted. The three signals may be in different phases from one another during transmission of each symbol.

The transmitter may obtain 2406 a signal to be transmitted via a first terminal (e.g., output terminal 1124) of the plurality of terminals (e.g., output terminals 1122, 1124, 1126). The signal may be one of the three signals.

The transmitter may drive the first terminal (e.g., output terminal 1124) by outputting a first voltage level (e.g., corresponding to a high level voltage) from a first driver (e.g. driver B1) when the signal is in a first phase 2408.

The transmitter may drive the first terminal (e.g., output terminal 1124) by outputting a second voltage level (e.g., corresponding to a low level voltage) from the first driver (e.g., driver B1) when the signal is in a second phase 2410.

The transmitter may drive a second terminal (e.g., output terminal 1122) of the plurality of terminals by outputting a fourth voltage level (e.g., corresponding to a high level voltage or a low level voltage) from a third driver (e.g., driver A1) and drive a third terminal (e.g., output terminal 1126) of the plurality of terminals by outputting a fifth voltage level (e.g., corresponding to a high level voltage or a low level voltage) from a fourth driver (e.g., driver C1) 2412.

The transmitter may drive the first terminal (e.g., output terminal 1124) by outputting a third voltage level (e.g., corresponding to a middle level voltage) from a second driver (e.g., driver B2) when the signal is in a third phase 2414. The third voltage level is output based on the fourth voltage level output from the third driver (e.g., driver A1) for driving the second terminal (e.g., output terminal 1122), and based on the fifth voltage level output from the fourth driver (e.g., driver C1) for driving the third terminal (e.g., output terminal 1126). Moreover, the third voltage level is within a range bounded by the first voltage level and the second voltage level.

According to certain aspects disclosed herein, the first driver (e.g., driver B1) includes a first transistor (e.g., pull-up transistor 1106) and a second transistor (e.g., pull-down transistor 1108). Hence, the transmitter may output the first voltage level from the first driver by turning on the first transistor and turning off the second transistor to output the first voltage level when the signal is in the first phase. The first terminal (e.g., output terminal 1124) is driven towards the first voltage level (e.g., high level voltage) when the first voltage level is output. Moreover, the transmitter may output the second voltage level from the first driver by turning on the second transistor and turning off the first transistor to output the second voltage level when the signal is in the second phase. The first terminal (e.g., output terminal 1124) is driven towards the second voltage level (e.g., low voltage level) when the second voltage level is output. The first transistor (e.g., pull-up transistor 1106) and the second transistor (e.g., pull-down transistor 1108) are turned off when the signal is in the third phase.

According to certain aspects disclosed herein, the second driver (e.g., driver B2) includes a third transistor (e.g. transistor 1114) and a fourth transistor (e.g., transistor 1116). Hence, the transmitter may output the third voltage level from the second driver when the signal is in the third phase by receiving the fourth voltage level output from the third driver (e.g., driver A1) and the fifth voltage level output from the fourth driver (e.g., driver C1), and turning on the third transistor (e.g., transistor 1114) and the fourth transistor (e.g., transistor 1116) of the second driver (e.g., driver B2) according to the received fourth voltage level and the received fifth voltage level to output the third voltage level. The first terminal (e.g., output terminal 1124) is driven towards the third voltage level (e.g., middle level voltage) when the third voltage level is output. In an aspect of the disclosure, the third voltage level (e.g., middle level voltage) is within a voltage range bounded by the first voltage level (e.g., high level voltage) and the second voltage level (e.g., low level voltage). Moreover, the third transistor (e.g., transistor 1114) and the fourth transistor (e.g., transistor 1116) are turned off when the signal is in the first phase or in the second phase.

Figure 25:
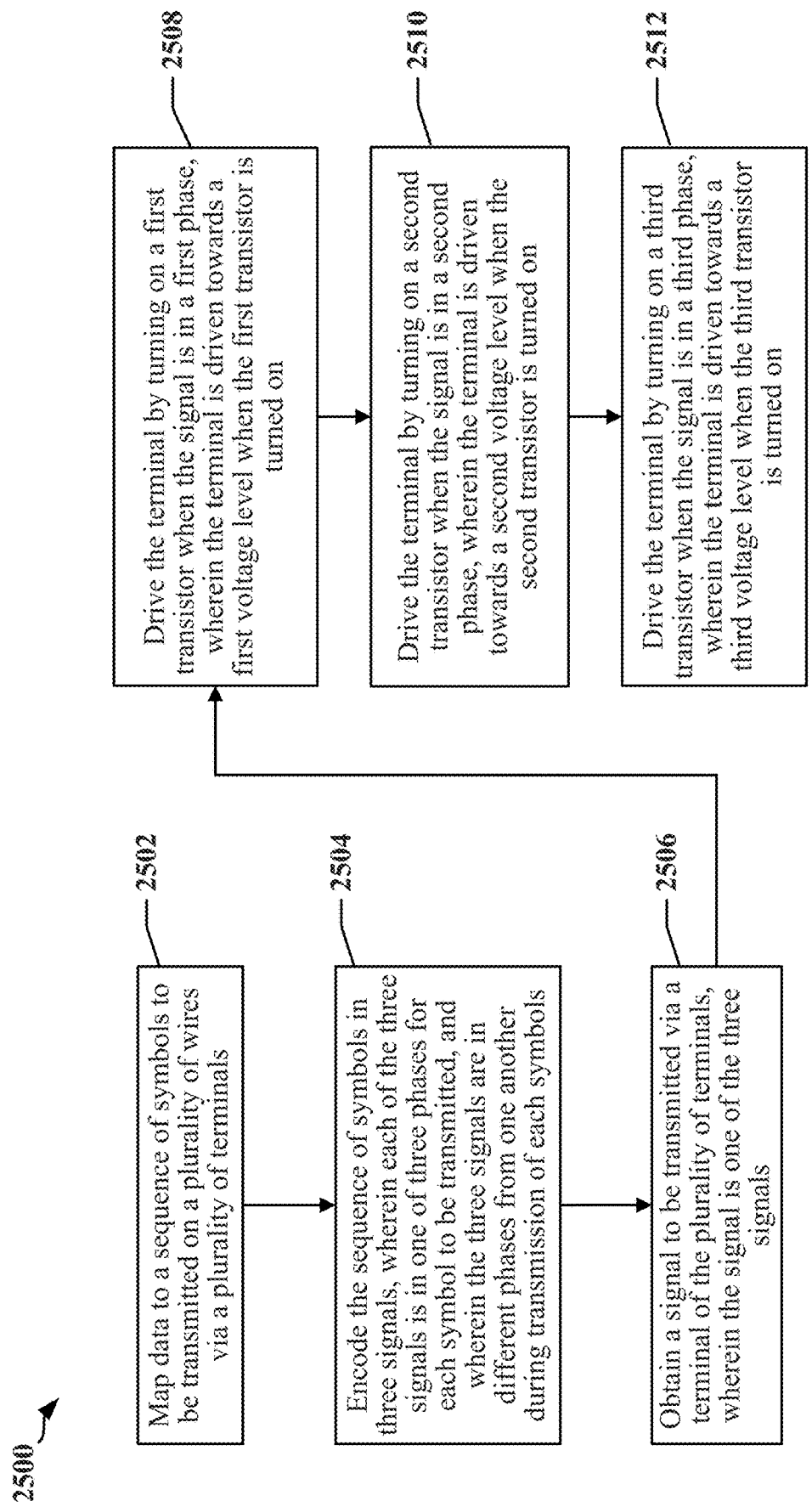
FIG. 25 is a flowchart illustrating another data transfer method.

FIG. 25 is a flowchart illustrating a data transfer method. The data transfer method may involve transmission of a plurality of symbols in multiphase signals. Each symbol may define a phase state for each signal and polarity for certain pairs of signals. The method may be performed by a transmitter (e.g., voltage mode driver 1320, 1720, 1820, 1920, or 2020 or apparatus 2300).

The transmitter may map data to a sequence of symbols to be transmitted on a plurality of wires via a plurality of terminals 2502. The transmitter may further encode the sequence of symbols in three signals 2504. Each of the three signals may be in one of three phases for each symbol to be transmitted. The three signals may be in different phases from one another during transmission of each symbol.

The transmitter may obtain 2506 a signal to be transmitted via a terminal (e.g., output terminal 1322, 1324, 1326, 1722, 1724, 1726, 1822, 1922, or 2022) of the plurality of terminals. The signal may be one of the three signals.

The transmitter may drive the terminal by turning on a first transistor (e.g., pull-up transistor 1302, 1306, 1310, 1702, 1706, 1710, 1802, 1902, or 2002) and turning off a second transistor (e.g., pull-down transistor 1304, 1308, 1312, 1704, 1708, 1712, 1804, 1904, or 2004) when the first signal is in a first phase 2508. The terminal is driven towards a first voltage level (e.g., high level voltage) when the first transistor is turned on.

The transmitter may drive the terminal by turning on the second transistor (e.g., pull-down transistor 1304, 1308, 1312, 1704, 1708, 1712, 1804, 1904, or 2004) and turning off the first transistor (e.g., pull-up transistor 1302, 1306, 1310, 1702, 1706, 1710, 1802, 1902, or 2002) when the first signal is in a second phase 2510. The terminal is driven towards a second voltage level (e.g., low level voltage) when the second transistor is turned on.

The transmitter may drive the terminal by turning on a third transistor (e.g., pull-middle transistor 1314, 1316, 1318, 1714, 1716, 1718, 1814, 1914, or 2014) when the first signal is in a third phase 2512. The terminal is driven towards a third voltage level (e.g., middle level voltage) when the third transistor is turned on. In an aspect of the disclosure, the third voltage level is within a voltage range bounded by the first voltage level (e.g., high level voltage) and the second voltage level (e.g., low level voltage). In another aspect, when one of the first transistor, the second transistor, and the third transistor is turned on, a remaining two of the first transistor, the second transistor, and the third transistor are turned off. In a further aspect of the disclosure, the third transistor (e.g., pull-middle transistor 1314, 1316, 1318, 1714, 1716, 1718, 1814, 1914, or 2014) is sourced by a voltage (e.g., voltage VM) supplied from a voltage regulator (e.g., LDO 1602) that also regulates a voltage (e.g., voltage VO) supplied to the first transistor (e.g., pull-up transistor 1302, 1306, 1310, 1702, 1706, 1710, 1802, 1902, or 2002). Alternatively, the third transistor (e.g., pull-middle transistor 1314, 1316, 1318, 1714, 1716, 1718, 1814, 1914, or 2014) is sourced by a voltage (e.g., voltage VM) supplied from a voltage regulator (e.g., LDO 2104) that is different from a voltage regulator (e.g., LDO 2102) that regulates a voltage (e.g., voltage VO) supplied to the first transistor (e.g., pull-up transistor 1302, 1306, 1310, 1702, 1706, 1710, 1802, 1902, or 2002).

According to aspects disclosed herein, driving the terminal when the first signal is in the third phase may include the transmitter turning off the first transistor (e.g., pull-up transistor 1302, 1306, 1310, 1702, 1706, 1710, 1802, 1902, or 2002) and the second transistor (e.g., pull-down transistor 1304, 1308, 1312, 1704, 1708, 1712, 1804, 1904, or 2004). Moreover, driving the terminal when the first signal is in the first phase or in the second phase may include the transmitter turning off the third transistor (e.g., pull-middle transistor 314, 1316, 1318, 1714, 1716, 1718, 1814, 1914, or 2014).

In an aspect of the disclosure, a source of the first transistor (e.g., transistor 1702/1802) and a source of the third transistor (e.g., transistor 1714/1814) are coupled to a first end of a first resistor (e.g., resistor 1752/1852), and a second end of the first resistor is coupled to the terminal (e.g., output terminal 1722/1822) and a first end of a second resistor (e.g., resistor 1754/1854). Moreover, the first end of the second resistor is coupled to the terminal and the second end of the first resistor, and a second end of the second resistor is coupled to a drain of the second transistor (e.g., transistor 1704/1804).

In another aspect of the disclosure, the first transistor (e.g., transistor 1702/1802) is sourced by a first voltage supply (VO) and the third transistor (e.g., transistor 1714/1814) is sourced by a second voltage supply (VM). The first voltage supply is regulated by a first voltage regulator (e.g., LDO 2102) that is different from a second voltage regulator (e.g., LDO 2104) that regulates the second voltage supply.

In a further aspect of the disclosure, a first end of a third resistor (e.g., resistor 1864) is coupled to the first voltage supply (VO), and a second end of the third resistor is coupled to a drain of the first transistor (e.g., transistor 1802). A first end of a fourth resistor (e.g., resistor 1866) is coupled to a source of the second transistor (e.g., transistor 1804), and a second end of the fourth resistor is coupled to a ground node. A first end of a fifth resistor (e.g., resistor 1868) is coupled to the second voltage supply (VM), and a second end of the fifth resistor is coupled to a drain of the third transistor (e.g., transistor 1814).

In an aspect of the disclosure, a source of the first transistor (e.g., transistor 1902/2002), a source of the third transistor (e.g., transistor 1914/2014), a first end of a resistor (e.g., resistor 1964/2070), and a drain of the second transistor (e.g., transistor 1904/2004) are coupled to each other. A second end of the resistor is coupled to the terminal (e.g., output terminal 1922/2022).

In another aspect of the disclosure, the first transistor (e.g., transistor 1902/2002) is sourced by a first voltage supply (VO) and the third transistor (e.g., transistor 1914/2014) is sourced by a second voltage supply (VM). The first voltage supply is regulated by a first voltage regulator (e.g., LDO 2102) that is different from a second voltage regulator (e.g., LDO 2104) that regulates the second voltage supply.

In a further aspect of the disclosure, a first end of a second resistor (e.g., resistor 2064) is coupled to the first voltage supply (VO), and a second end of the second resistor is coupled to a drain of the first transistor (e.g., transistor 2002). A first end of a third resistor (e.g., resistor 2066) is coupled to a source of the second transistor (e.g., transistor 2004), and a second end of the third resistor is coupled to a ground node. A first end of a fourth resistor (e.g., resistor 2068) is coupled to the second voltage supply (VM), and a second end of the fourth resistor is coupled to a drain of the third transistor (e.g., transistor 2014).

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for data transfer, comprising:
   a plurality of terminals;
   a line driver configured to transmit a signal via a terminal of the plurality of terminals, the signal being in one of three phases,
   wherein the line driver includes a first transistor, a second transistor, and a third transistor, wherein a source of the first transistor, a source of the third transistor, a first end of a resistor, and a drain of the second transistor are directly coupled to each other, and wherein a second end of the resistor is coupled to the terminal,
   wherein the first transistor is sourced by a first voltage supply and the third transistor is sourced by a second voltage supply, wherein the first voltage supply is regulated by a first voltage regulator that is separate from a second voltage regulator that regulates the second voltage supply,
   wherein a first end of a second resistor is coupled to the first voltage supply, and a second end of the second resistor is coupled to a drain of the first transistor,
   wherein a first end of a third resistor is coupled to a source of the second transistor, and a second end of the third resistor is coupled to a ground node,
   wherein a first end of a fourth resistor is coupled to the second voltage supply, and a second end of the fourth resistor is coupled to a drain of the third transistor, and
   wherein the line driver is configured to:
      drive the terminal towards a first voltage level by turning on the first transistor when the signal is in a first phase,
      drive the terminal towards a second voltage level by turning on the second transistor when the signal is in a second phase, and
      drive the terminal towards a third voltage level by turning on the third transistor when the signal is in a third phase;
   a transmission line having a first line end coupled to the terminal; and
   a terminating resistor coupled to a second line end of the transmission line, the terminating resistor configured to maintain the third voltage level at the transmission line.

2. The apparatus of claim 1, further including a processing circuit coupled to the line driver, the processing circuit configured to:
   map data to a sequence of symbols to be transmitted on a plurality of wires via the plurality of terminals;
   encode the sequence of symbols in three signals, wherein each of the three signals is in one of three phases for each symbol to be transmitted, and wherein the three signals are in different phases from one another during transmission of each symbol; and
   obtain the signal to be transmitted via the terminal of the plurality of terminals, wherein the signal is one of the three signals.

3. The apparatus of claim 1, wherein when one of the first transistor, the second transistor, and the third transistor is turned on, a remaining two of the first transistor, the second transistor, and the third transistor are turned off.

4. A method of data transfer, comprising:
   obtaining a signal to be transmitted via a terminal of a plurality of terminals, wherein the signal is in one of three phases;
   driving the terminal towards a first voltage level by turning on a first transistor when the signal is in a first phase;
   driving the terminal towards a second voltage level by turning on a second transistor when the signal is in a second phase; and
   driving the terminal towards a third voltage level by turning on a third transistor when the signal is in a third phase,
   wherein a source of the first transistor, a source of the third transistor, a first end of a resistor, and a drain of the second transistor are directly coupled to each other,
   wherein a second end of the resistor is coupled to the terminal,
   wherein the first transistor is sourced by a first voltage supply and the third transistor is sourced by a second voltage supply, wherein the first voltage supply is regulated by a first voltage regulator that is separate from a second voltage regulator that regulates the second voltage supply,
   wherein a first end of a second resistor is coupled to the first voltage supply, and a second end of the second resistor is coupled to a drain of the first transistor,
   wherein a first end of a third resistor is coupled to a source of the second transistor, and a second end of the third resistor is coupled to a ground node, wherein a first end of a fourth resistor is coupled to the second voltage supply, and a second end of the fourth resistor is coupled to a drain of the third transistor, and wherein a first line end of a transmission line is coupled to the terminal and a second line end of the transmission line is coupled to a terminating resistor, the terminating resistor configured to maintain the third voltage level at the transmission line.

5. The method of claim 4, further including:

mapping data to a sequence of symbols to be transmitted on a plurality of wires via the plurality of terminals; and encoding the sequence of symbols in three signals, wherein each of the three signals is in one of three phases for each symbol to be transmitted, and wherein the three signals are in different phases from one another during transmission of each symbol, wherein the signal to be transmitted via the terminal of the plurality of terminals is one of the three signals.

6. The method of claim 4, wherein the third voltage level is within a voltage range bounded by the first voltage level and the second voltage level.

7. A non-transitory processor-readable storage medium having one or more instructions which, when executed by at least one processing circuit, cause the at least one processing circuit to:

obtain a signal to be transmitted via a terminal of a plurality of terminals, wherein the signal is in one of three phases;

drive the terminal towards a first voltage level by turning on a first transistor when the signal is in a first phase;

drive the terminal towards a second voltage level by turning on a second transistor when the signal is in a second phase; and drive the terminal towards a third voltage level by turning on a third transistor when the signal is in a third phase, wherein a source of the first transistor, a source of the third transistor, a first end of a resistor, and a drain of the second transistor are directly coupled to each other, wherein a second end of the resistor is coupled to the terminal, wherein the first transistor is sourced by a first voltage supply and the third transistor is sourced by a second voltage supply, wherein the first voltage supply is regulated by a first voltage regulator that is separate from a second voltage regulator that regulates the second voltage supply, wherein a first end of a second resistor is coupled to the first voltage supply, and a second end of the second resistor is coupled to a drain of the first transistor, wherein a first end of a third resistor is coupled to a source of the second transistor, and a second end of the third resistor is coupled to a ground node, wherein a first end of a fourth resistor is coupled to the second voltage supply, and a second end of the fourth resistor is coupled to a drain of the third transistor, and wherein a first line end of a transmission line is coupled to the terminal and a second line end of the transmission line is coupled to a terminating resistor, the terminating resistor configured to maintain the third voltage level at the transmission line.

8. The non-transitory processor-readable storage medium of claim 7, wherein the one or more instructions further cause the at least one processing circuit to:

map data to a sequence of symbols to be transmitted on a plurality of wires via the plurality of terminals; and encode the sequence of symbols in three signals, wherein each of the three signals is in one of three phases for each symbol to be transmitted, and wherein the three signals are in different phases from one another during transmission of each symbol, wherein the signal to be transmitted via the terminal of the plurality of terminals is one of the three signals.

\* \* \* \* \*